United States Patent
Roberts et al.

(10) Patent No.: US 12,057,003 B2
(45) Date of Patent: Aug. 6, 2024

(54) SYSTEM AND METHOD FOR DECIPHERING AND MAPPING SIGNALS FROM AN ELECTRONIC CONTROL UNIT FOR USE IN OCCUPANT SAFETY

(71) Applicant: The Rocket Innovation Company Ltd., Taoyuan (TW)

(72) Inventors: Tracey Carl Roberts, Taipei (TW); Kuan-Chung Chiu, Hsinchu (TW)

(73) Assignee: THE ROCKET INNOVATION COMPANY LTD., Taoyuan (TW)

( * ) Notice: Subject to any disclaimer, the term of this patent is extended or adjusted under 35 U.S.C. 154(b) by 53 days.

(21) Appl. No.: 18/152,043

(22) Filed: Jan. 9, 2023

(65) Prior Publication Data
US 2023/0186751 A1    Jun. 15, 2023

Related U.S. Application Data

(63) Continuation-in-part of application No. PCT/US2020/040975, filed on Jul. 7, 2020.

(51) Int. Cl.
*G08B 21/00* (2006.01)
*B60N 2/00* (2006.01)
*G08B 21/22* (2006.01)

(52) U.S. Cl.
CPC ............. *G08B 21/22* (2013.01); *B60N 2/002* (2013.01)

(58) Field of Classification Search
CPC .... G08B 21/22; G08B 21/24; G08B 21/0269; B60N 2/002; B60N 2/28; B60R 21/01556; B60H 1/00742
USPC .............................................. 340/573.4, 438
See application file for complete search history.

(56) References Cited

U.S. PATENT DOCUMENTS

| | | | |
|---|---|---|---|
| 6,714,132 B2 | 3/2004 | Edwards et al. | |
| 6,812,844 B1 | 11/2004 | Burgess | |
| 7,012,533 B2 | 3/2006 | Younse | |
| 10,306,428 B1* | 5/2019 | Khanna | H04W 4/38 |
| 2002/0161501 A1 | 10/2002 | Dulin et al. | |
| 2004/0057432 A1* | 3/2004 | Allen | H04L 12/4135 |
| | | | 370/252 |
| 2004/0113797 A1 | 6/2004 | Osborne | |
| 2005/0077469 A1* | 4/2005 | Kaushal | B60R 21/01552 |
| | | | 250/342 |
| 2006/0222206 A1* | 10/2006 | Garoutte | H04N 7/18 |
| | | | 382/103 |
| 2014/0253313 A1* | 9/2014 | Schoenberg | B60N 2/2812 |
| | | | 340/457 |
| 2014/0253314 A1 | 9/2014 | Rambadt et al. | |

(Continued)

*Primary Examiner* — Mark S Rushing

(57) ABSTRACT

A system and method for deciphering signals and messages from a control unit, and mapping those signals to the associated sensors to create a map of the sensor status. The map of the sensor status is then used in conjunction with a dongle and software application to interface with the control unit, able to receive messages from the control unit to monitor the status of the sensors, and to send messages to the control unit to manipulate the sensors. The system and method can further be used to interface with the electronic control unit of a vehicle to detect unattended access of the vehicle and ensure no passengers are left abandoned in the vehicle, such as by sending alerts to a mobile device of the user, triggering alarms in the vehicle, or sending alerts to emergency services.

20 Claims, 20 Drawing Sheets

(56) References Cited

U.S. PATENT DOCUMENTS

| | | | |
|---|---|---|---|
| 2015/0379870 A1* | 12/2015 | Neuman | G08G 1/042 340/941 |
| 2019/0080584 A1 | 3/2019 | Rubinstein | |
| 2019/0306592 A1* | 10/2019 | Pusheck | H04L 67/12 |
| 2020/0062080 A1 | 2/2020 | Hernandez | |

* cited by examiner

SYSTEM AND METHOD FOR DECIPHERING AND MAPPING SIGNALS FROM AN ELECTRONIC CONTROL UNIT FOR USE IN OCCUPANT SAFETY

FIELD OF THE INVENTION

The present invention relates generally to electronic signal processing. Specifically, the present invention is a system and method for deciphering and mapping signals from an electronic control unit for use in occupant safety, such as detecting unattended passengers and creating alerts and alarms.

BACKGROUND OF THE INVENTION

Vehicles can be an extremely dangerous deathtrap for the unwary. There are over 900 recorded deaths from pediatric vehicular heatstroke (PVH) from children being left in vehicles. Not only children are at risk from this, but anyone that requires physical assistance or guardianship may be at risk for abandonment and death by heatstroke in vehicles. As such, it is desirable to have a system or method in place to safeguard these vulnerable populations from the risks associated with vehicular heatstroke. To limit the amount of modification to vehicles necessary to achieve an occupancy identification capability, vehicle built in sensors and systems can be used for monitoring. However, the way vehicles are manufactured can make this exceedingly difficult. Most vehicles are structured in a way that makes control signals difficult to decipher, even with access to the onboard diagnostic port. For example, data received from the onboard diagnostic port may have an identifier and data string, but it is unclear what either the identifier or data string represent. This makes it exceedingly difficult to make use of existing vehicle sensors and alarms for any purpose, such as protecting a vehicle's occupants, unless the manufacturer of the vehicle makes changes directly. Existing proposed solutions do not adequately address the need to create a universal solution that works on the plethora of different car makes and models on the market, and may fail to adequately propose methods to safeguard those at risk from vehicular heatstroke.

The present invention aims to solve these issues by creating a universally applicable solution for deciphering, mapping, and using the sensors of existing vehicles, regardless of make or model. The present invention aims to connect to vehicle's sensors, listen for signals, decipher the signals and map them to the relevant sensor, then use these sensors in conjunction with a software application to assist the user in preventing abandonment of a passenger in the vehicle in the first place, as well as altering the user if a vulnerable passenger is in the vehicle unattended. Further, the deciphered information from the signals may be generally useful to the owner of the vehicle for other purposes. The present invention further creates a failsafe system of alerts and alarms if an infirmed person remains unattended in the vehicle. The present invention is thus capable of utilizing the signals from the control unit of any vehicle to determine, for example, when a user is about to exit the vehicle, if a passenger is in the vehicle, and if a passenger has been left in the vehicle. The present invention can further provide alerts and alarms to the user or emergency services if a passenger is left unattended in the vehicle, or can trigger safeguards to prevent heatstroke, such as lowering the vehicle's windows, running the air conditioning system, or triggering the car alarm to draw the attention of passerby or emergency services workers. In this way, the present invention can decipher signals from vehicles of any manufacture, and use a software application to map these signals to the relevant sensors, then use this information to safeguard occupants against heatstroke by triggering the relevant sensors in the vehicle, alerting guardians, and requesting emergency services assistance.

DETAIL DESCRIPTIONS OF THE INVENTION

Figure 1:
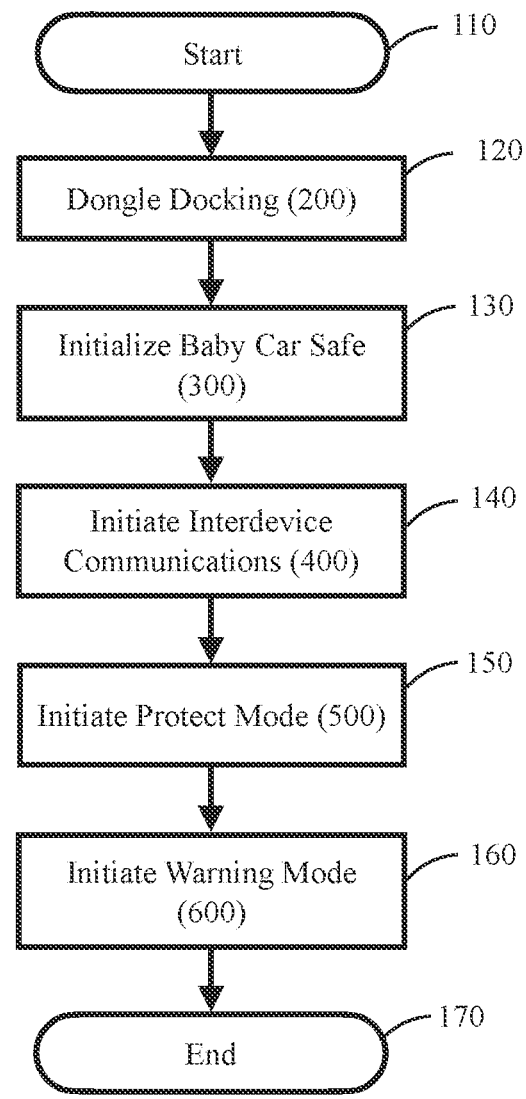
FIG. 1 is a flowchart showing the processes of using the Baby Car Safe.

All illustrations of the drawings are for the purpose of describing selected versions of the present invention and are not intended to limit the scope of the present invention.

The word "control unit" in this document should be construed to generally refer to any device capable of sending and receiving data messages. For example, "control unit" should also be understood to encompass multiple control units communicating via a single data bus. However, the ideal embodiment of the present invention specifically contemplates that "control unit" refers to the databus upon which the electric control unit or units (ECU) of a vehicle or automobile communicate.

The present invention is a system and method for deciphering and mapping signals from an electronic control unit for use in occupant safety. The present invention comprises a method for deciphering and mapping signals from a control unit 100. The present invention further comprises a software application 302 that implements and maps the data received from the deciphering and mapping process.

Broadly speaking, the method for deciphering and mapping signals from a control unit 100 comprises the following steps:
 a. Accessing a data stream 102 from the control unit 100;
 b. Continuously downloading the data stream 102 from the control unit 100;
 c. Initializing a negative mask list 104, a positive mask list 106, and a candidate list 108;
 d. Ensuring a targeted sensor 138 is not in use;
 e. Building the negative mask list 104;
 f. Exercising the targeted sensor 138;
 g. Receiving a sensor signal from the targeted sensor 138;
 h. Building the positive mask list 106;
 i. Building the candidate list 108;
 j. Repeating steps (a)-(i) to narrow the candidate list 108; and
 k. Mapping the sensor status with the relevant candidate 116 in the candidate list 108 to create a map of the sensor status 132.

Step (a) comprises accessing a data stream 102 from the control unit 100. To accomplish this, the user must access the data stream 102. In the ideal embodiment, this is done through the use of a dongle 212, though the use of any other processing device is contemplated.

Figure 9:
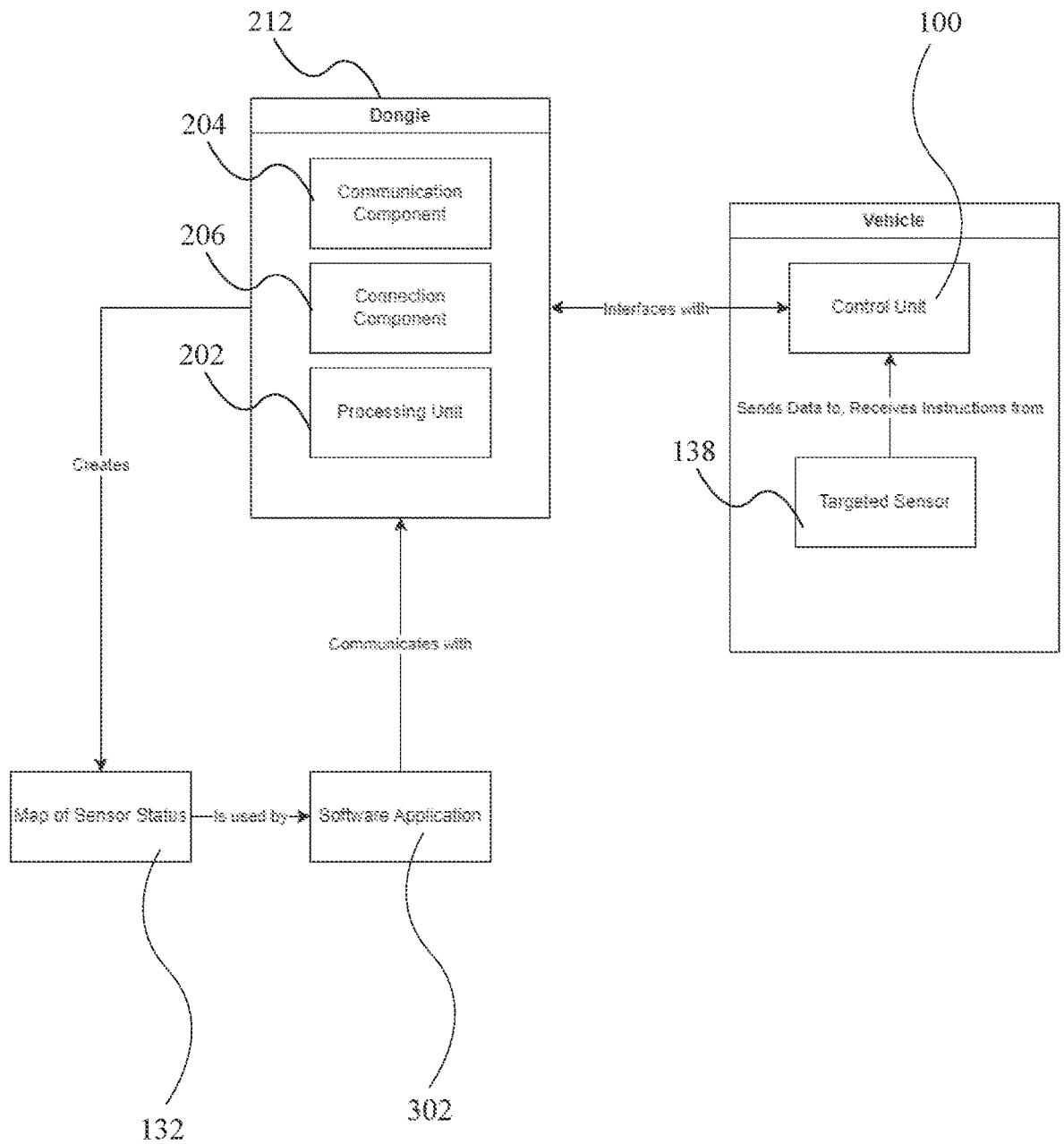
FIG. 9 shows an example overview of the components of the system and how they interact.
Figure 14:
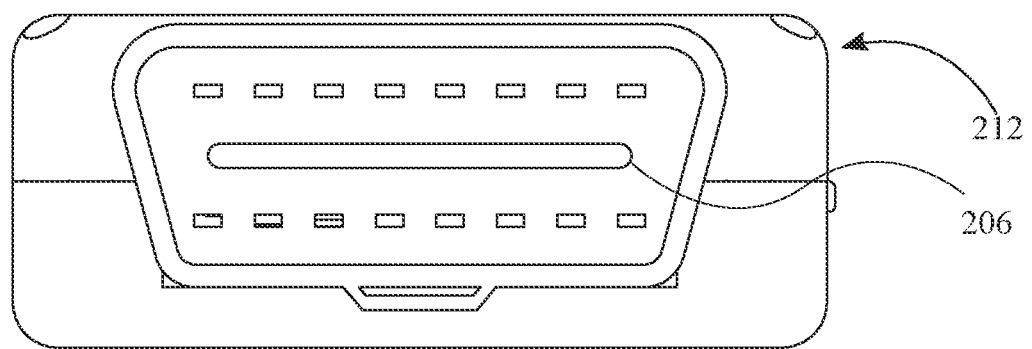
FIG. 14 shows a bottom view of the dongle.
Figure 15:
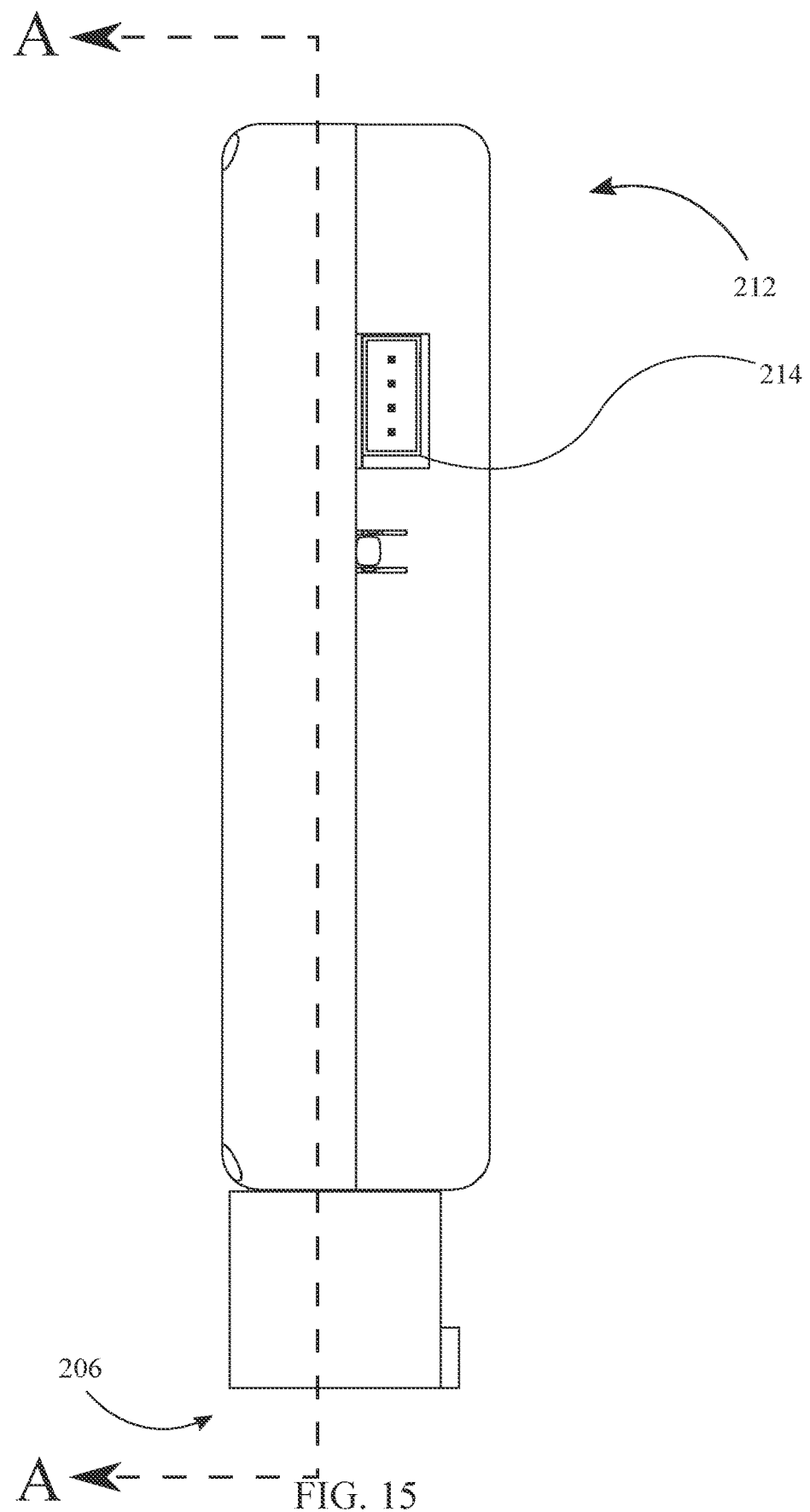
FIG. 15 shows a right-side view of the dongle.
Figure 16:
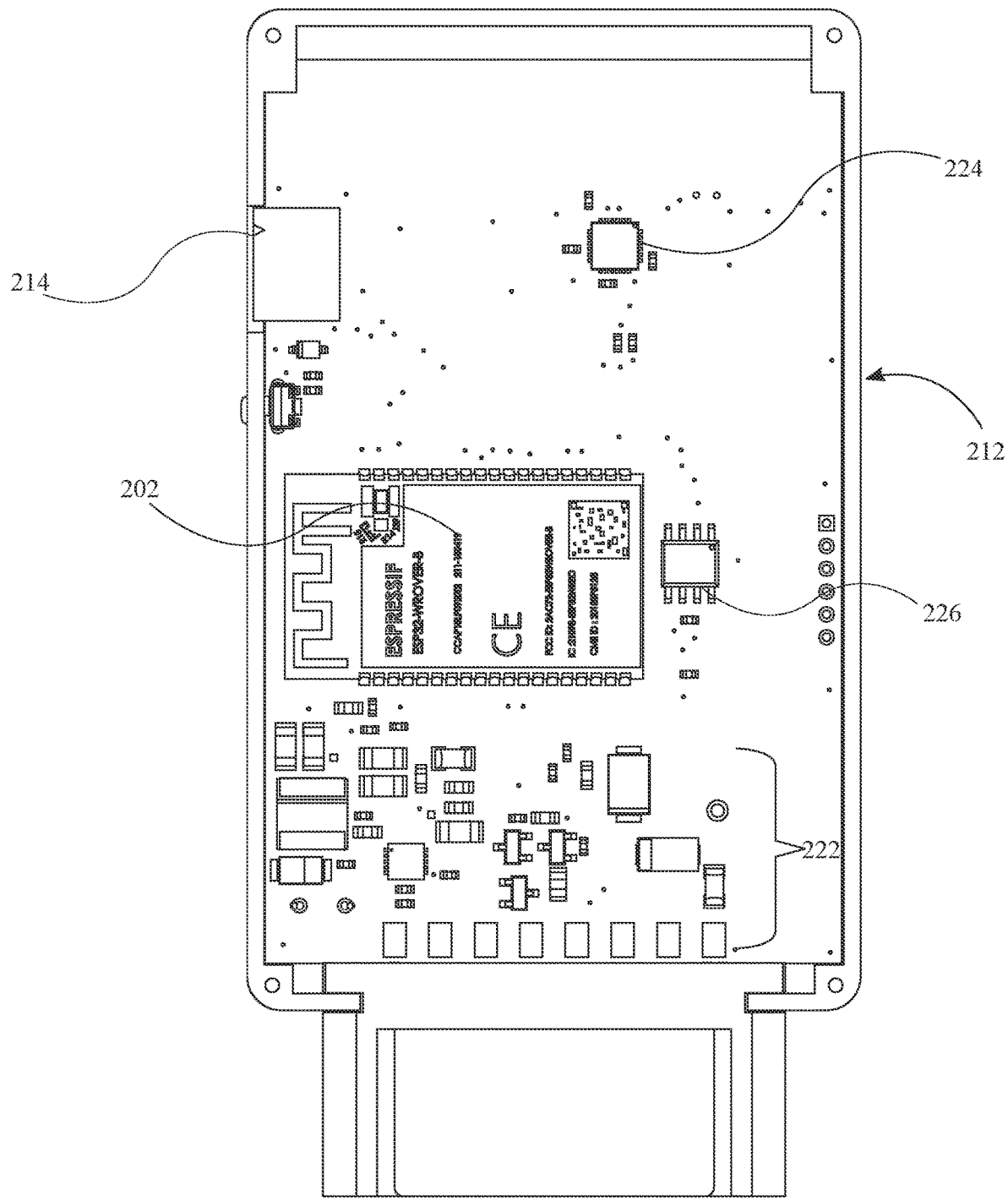
FIG. 16 shows a cross-sectional view of FIG. 15 taken along line A-A.

Referring to FIGS. 13-16, and FIGS. 18-19, the dongle comprises a processor 202, a communication component 204, a connection component 206, a GPS antenna 208, an auxiliary port 214, a cellular antenna 216, power management components 222, an IMU motion sensor 224, and a CANBus XCVR 226. The processor 202 is configured to read incoming signal data, sort signal data based on an associated identifier 118, and compare all incoming signal data against each other to determine which vehicle sensor is associated with the signal data and identifier 118. In another embodiment, the use of a software application 302 may accomplish the functions of the processor 202 using the processor of a separate device, such as a mobile phone. However, in the ideal embodiment, the software application 302 is implemented using the processor 202 of the dongle 212. The communication component 204 is adapted to allow the dongle to connect to the control unit 100. The communication component 204 may connect to the control unit 100 through wireless communication, or may be adapted to communicate through a direct connection to the control unit 100, such as through the use of a physical connection. The communication component 204 may comprise an element such as a modem, a radio access capable component such as LTE-M, may support other wireless communications technology such as Bluetooth, or may include any other high speed means of wireless communication. The connection component 206 may be a wireless communication device or may be a direct connector configured to be wired directly to the control unit 100, such as through the use of a physical connection like a 16-pin connector to connect directly to an onboard diagnostic port (OBD port) on the control unit 100, as seen in FIGS. 9 and 14. The dongle 212 is further configured to use the communication component 204 to send the data to the associated software application 302 for further processing and use. Alternatively, the dongle 212 can be connected directly to the wire leads from a vehicle using the connection component 206 to receive signals from the vehicle's sensors and systems. In the ideal embodiment, the dongle 212 would be installed into the vehicle during the manufacturing process. The connection component 206 is configured to both send and receive data messages to the control unit 100. The dongle 212 may further comprise the cellular antenna 216, adapted to perform cellular communications.

The dongle 212 may further comprise the GPS antenna 208, allowing for location information to be obtained for use with the software application 302 to send alerts to emergency services, described in more detail below.

The dongle 212 may further comprise an auxiliary port 214, allowing for connection to external components to provide power or exchange other data. The auxiliary port 214 may comprise a USB or other connection.

In the ideal embodiment, the dongle 212 receives power from a vehicle power supply. The power supply is accessed through the connection component 206, or can be accessed by directly wiring the vehicle power supply to the dongle 212. The dongle 212 may further comprise power management components 222 for converting the power supply from the vehicle power supply into the requisite voltage for the components of the dongle 212. For example, the power management components 222 may convert the 12V power supply of a vehicle into a 5V, 3V, 3.3V, and 3.8V power supply for the various components of the dongle 212. The dongle 212 can further use the power management components 222 to monitor and report the charge level of the vehicle battery. The power management can further be used to monitor and report the battery level of other associated controllers or components, such as the battery 412 of the pad sensor 402, described in greater detail below.

The dongle 212 may further comprise an IMU motion sensor 224 to help determine occupancy in a vehicle by sensing the presence of motion.

The dongle 212 may further comprise a CANbus XCVR 226 or similar transceiver to send and receive data from the connected control unit 100.

One challenge involved in step (a) is to ensure that the data stream 102 can be properly read by the dongle 212 or other processing device. Every data bus has defined access methods in terms of speed (the baud rate) and protocols. While the speed and protocols vary from make and model, these elements are standardized within the automobile industry. As such, there is a finite number of combinations that can be used to determine which communications protocols and speed are used by the control unit 100, which can be identified in a list of data rates and protocols. Step (a) thus further comprises using a rotating access query method to cycle through the list of data rates and protocols until a supported connection is found. Baud rates used may comprise, but are not limited to: 9600, 38400, 19212, 57600, 115212. Protocols used may comprise, but are not limited to: CAN 11/500 (ISO 15765-4), CAN 29/500 (ISO 15765-4), CAN 11/250 (ISO 15765-4), CAN 29/250 (ISO 15765-4), CAN 29/250 (SAE J1939), PWM (SAE J1850), VPW (SAE J1850), and KWP2120 (ISO 14230). During this step, one of these combinations of baud rates and protocols will yield a successful match with the control unit's 100 communication protocol and speed. At this point, the dongle 212 can establish a successful connection with the control unit 100 using the identified communication protocol and speed.

Figure 8:
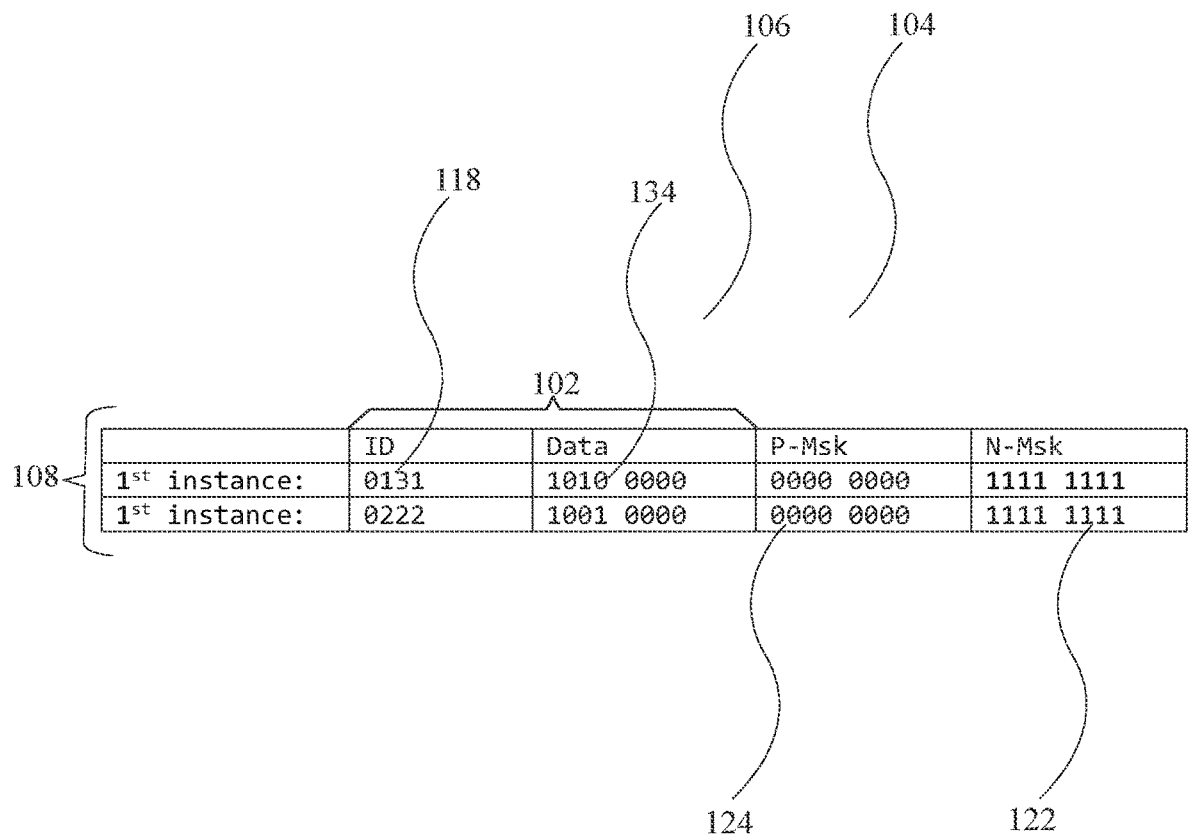
FIG. 8 shows an example of a Mask List initialization.

Once a successful connection is established between the control unit 100 and the dongle 212 using the connection component 206, step (b) is initiated. The dongle 212 now continuously downloads a data dump from the data stream 102 of the control unit 100. This data stream 102 is decoded and formatted in the form of identifiers 118 combined with message data 134. For the purposes of explanation, a simplified common 11-bit CAN bus data element is used here, but it should be noted that the use of any other of the protocols including but not limited to the protocols listed above is contemplated by the present invention. For example, as seen in FIG. 8, the message comprises an identifier 118 and message data 134. The identifier 118 is a short string of bits that is intended to identify the associated sensor or system. The message data 134 is a longer string of bits that is intended to identify the condition of the associated sensor or system. However, one challenge that arises here is that the identifier 118 may be used to identify a group of systems and sensors, rather than an individual system or sensor. For example, the identifier 118 "131" coupled with the message data 134 "08471AB340001212" could be used to represent all the following sensors and states: Drivers Door=Open, Transmission Gear=Park, and Drivers Seatbelt=Fastened. As such, further steps are needed to adequately decipher these identifiers 118 and status indicators to map the identifiers 118 and message data 134 to the appropriate sensors.

Thus, it is necessary to create a list of potential candidates to properly identify which identifier 118 and message data 134 corresponds to which sensor. Step (c) involves initializing a negative mask list 104 a positive mask list 106, and a candidate list 108. Each candidate 116 in the candidate list 108 is associated with an identifier 118, a positive mask 124, and a negative mask 122. The bits of the positive mask 124 should be all zeroes when initialized. The bits of the negative mask 122 should be all ones when initialized. The candidate list 108 also comprises a list containing each identifier 118 received by the dongle 212 thus far in the process, and each entry in the candidate list 108 further comprises a positive mask 124 and a negative mask 122.

Next, step (d) comprises ensuring a targeted sensor 138 is not in use. For example, if the user is seeking to identify which identifier 118 and message data 134 corresponds to door opening sensor, the user will ensure the door remains in the same state throughout the process, until step (f).

Figure 7:
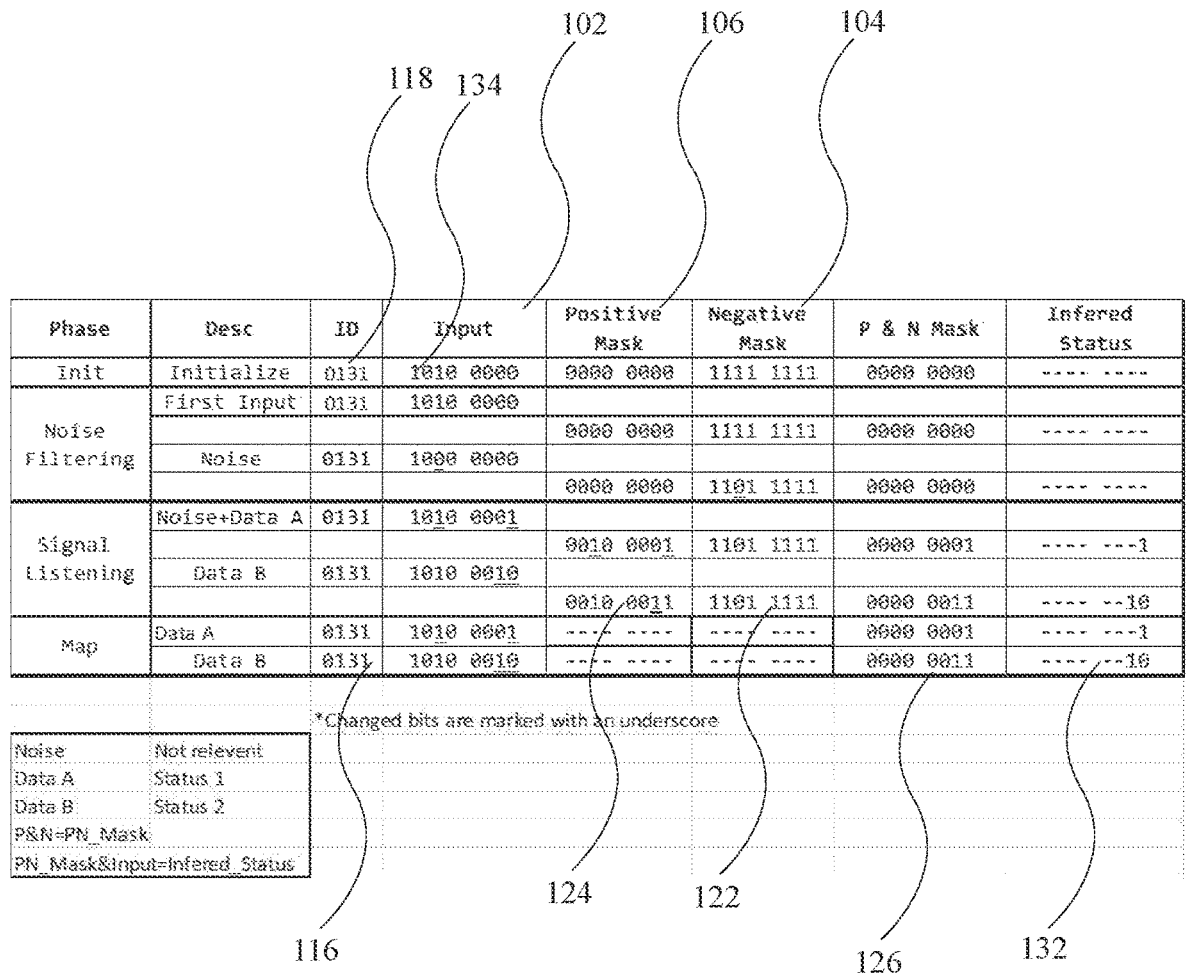
FIG. 7 shows an example overview of the process of mapping the sensor status from the data stream in steps (a)-(k).

Next, step (e) comprises building the negative mask list 104. If an identifier 118 is received in a new message from the data stream 102 and is not yet present in the candidate list 108, it is added to the candidate list 108 along with the associated message data 134. If a new message is received, and the identifier 118 is already on the candidate list 108, the data from the new message is compared with the message data 134 on the candidate list 108. Any bit of changing data that is different between the message data 134 on the candidate list 108 and the data from the new message is marked in the negative mask 122. This is done by changing the associated bits in the negative mask 122 from ones to zeroes, as seen in FIG. 7. If a bit is marked to a zero in the negative mask list 104, this indicates that the bit is "noise" and should be ignored in determining the status of the targeted sensor 138, as the targeted sensor 138 is not in use at this time. Step (e) runs for a short period of time to ensure that all noise is marked in the negative mask list 104. Once this period of time ends, step (e) ceases and new incoming messages will no longer be marked as noise.

Next, step (f) comprises exercising the targeted sensor 138. Now that all the noise has been identified, the targeted sensor 138 must be exercised to determine which message data 134 is associated with the various states of the targeted sensor 138. For example, if the door of a vehicle is the targeted sensor 138, the door should be opened and closed to trigger the messages associated with the door opening and closing.

Next, step (g) comprises receiving the sensor signal from the targeted sensor 138. The sensor signal is received by the connected dongle 212 or other processing device. The sensor signal comprises an identifier 118 and a message data 134.

Next, step (h) comprise building the positive mask list 106. Similar to step (e), the incoming messages from the data stream 102 are compared to the existing information on the candidate list 108. If an identifier 118 is received in a new message from the data stream 102 and is not yet present in the candidate list 108, it is added to the candidate list 108 along with the associated message data 134. If a new message is received, and the identifier 118 is already on the candidate list 108, the data from the new message is compared with the message data 134 on the candidate list 108. Any bit of data that is different between the message data 134 on the candidate list 108 and the data from the new message is marked in the positive mask 124. This is done by changing the associated bits in the positive mask 124 from zeroes to ones, as seen in FIG. 7. These bits are intended to correspond to the potential candidate bits that are associated with the targeted sensor 138. Before this step is stopped, a listening delay may be inserted to continue to monitor the data stream 102 and continue step (h). This is inserted to avoid the effects of network congestion on the control unit 100 and associated data bus. If a signal is low priority, it may be placed farther back in the queue to be transmitted to or from the control unit 100. As such, inserting a listening delay ensure that even non-essential data and messages from the control unit 100 are properly monitored.

Next, step (i) comprises building the final candidate list 108. This is done by creating a combined mask 126 for each entry in the candidate list 108. The combined mask 126 is created by combining the negative mask 122 and positive mask 124 for each identifier 118 in the candidate list 108. This is accomplished by combining the negative mask 122 and the positive mask 124 with a logical AND. If the negative mask 122 has a one bit, and the positive mask 124 has a one bit, this indicates that the associated bit is both not noise and is relevant to the changing state of the targeted sensor 138. The combined mask 126 thus will have ones in each position that corresponds to the message data 134 for bits that both are not noise and are associated with the condition of the targeted sensor 138. Any candidate 116 having a combined mask 126 with any one bits having a value of one present is appended to the candidate list 108. For each candidate in the candidate list 108, if the combined mask 126 is null, the candidate 116 is removed from the candidate list 108. The candidate list 108 should comprise at least one candidate 116 by the end of this step. If no candidate 116 is present, steps (a)-(h) should be repeated.

Next, step (j) involves repeating steps (a)-(i) to narrow the candidate list 108. While the listening delay of step (h) can ensure even low priority signals are properly mapped, it can also introduce addition noise and pollute the positive mask 124. As such, running the method through multiple iterations can help filter out additional noise and remove the pollution from the positive mask 124, further refining the candidate list 108 to ideally one candidate 116, or at least a feasible number of candidates 116.

Next, step (k) comprises mapping the sensor status with the relevant candidate 116 in the candidate list 108 to create a map of the sensor status 132. Once a feasible number of candidates 116 are present on the candidate list 108 from step (j), the sensor can continue to be exercised. The message data 134 received during this process is combined with the combined mask 126 for each candidate 116 on the candidate list 108. This will narrow down the candidate list 108 to identify the correct candidate 116 showing the relevant bits that correspond to the various states of the targeted sensor 138. The various states of the targeted sensor 138 may then be mapped to the associated identifier 118 and data, as seen in FIG. 7. In the ideal embodiment, the mapping process of step (k) may be performed by the software application 302. In the ideal embodiment, the map of the sensor status 132 may further be used to create sensor groups for future use with the software application 302. For example, all the sensors relating to the driver's status may be grouped together, such as the drivers side door, seatbelt, transmission, and other sensors that would give information on the driver's status.

Once all relevant sensors of the control unit 100 have been appropriately mapped, that data may be used for the purpose of improving vehicle safety and preventing heatstroke death for abandoned passengers or children. This process can be implemented through the use of the software application 302.

The software application 302 may be installed upon the mobile device of a user, the dongle 212, or within the vehicle itself. The software application 302 has a variety of functionalities, including: determining vehicle occupancy, cycling through a plurality of occupancy monitoring modes, accessing sensor groups, anticipating occupancy changes, and issuing alerts and alarms.

In the ideal embodiment, the software application 302 is adapted to communicate with the communication component 204 of the dongle 212 by making use of the communication devices or technology from the device upon which the software application 302 is installed, such as a mobile phone or computer. In this way, the software application 302 is adapted to receive any relevant data from the dongle 212, including the data stream 102, the map of the sensor status 132, or any other relevant data.

The software application 302 may use the map of the sensor status 132 in determining the status of the sensors in an associated vehicle. For example, the map of the sensor status 132 in steps (a)-(k) may indicate that the identifier 118 having the label "131" and message data "167" may correspond to the seatbelt of the driver being fastened. The software application 302 can thus screen the data stream 102 being sent from the dongle 212 for this identifier 118 and message data 134. When received, the software application 302 can thus determine that the seatbelt is in a fastened state, and will track this information relating to the status of the sensors for use in the anti-abandonment protocol and unattended access protocols, described in greater detail below. Thus, the software application 302 may make use of the sensors of the vehicle by monitoring the incoming data stream 102 and referencing the data stream 102 with the previously created map of the sensor status 132 for purposes such as determine vehicle occupancy, accessing sensor groups, anticipating occupancy changes, and issuing alerts and alarms. As the dongle 212 is also adapted to send messages to the control unit 100, the software application 302 may also be used to send messages to the dongle 212, which then sends those messages to the control unit 100 to trigger change in status in the vehicle. For example, the software application 302 may be used to send a message to the control unit 100 to set the windows to a lowered position, to flash the lights, or to honk the horn of the vehicle.

Figure 17:
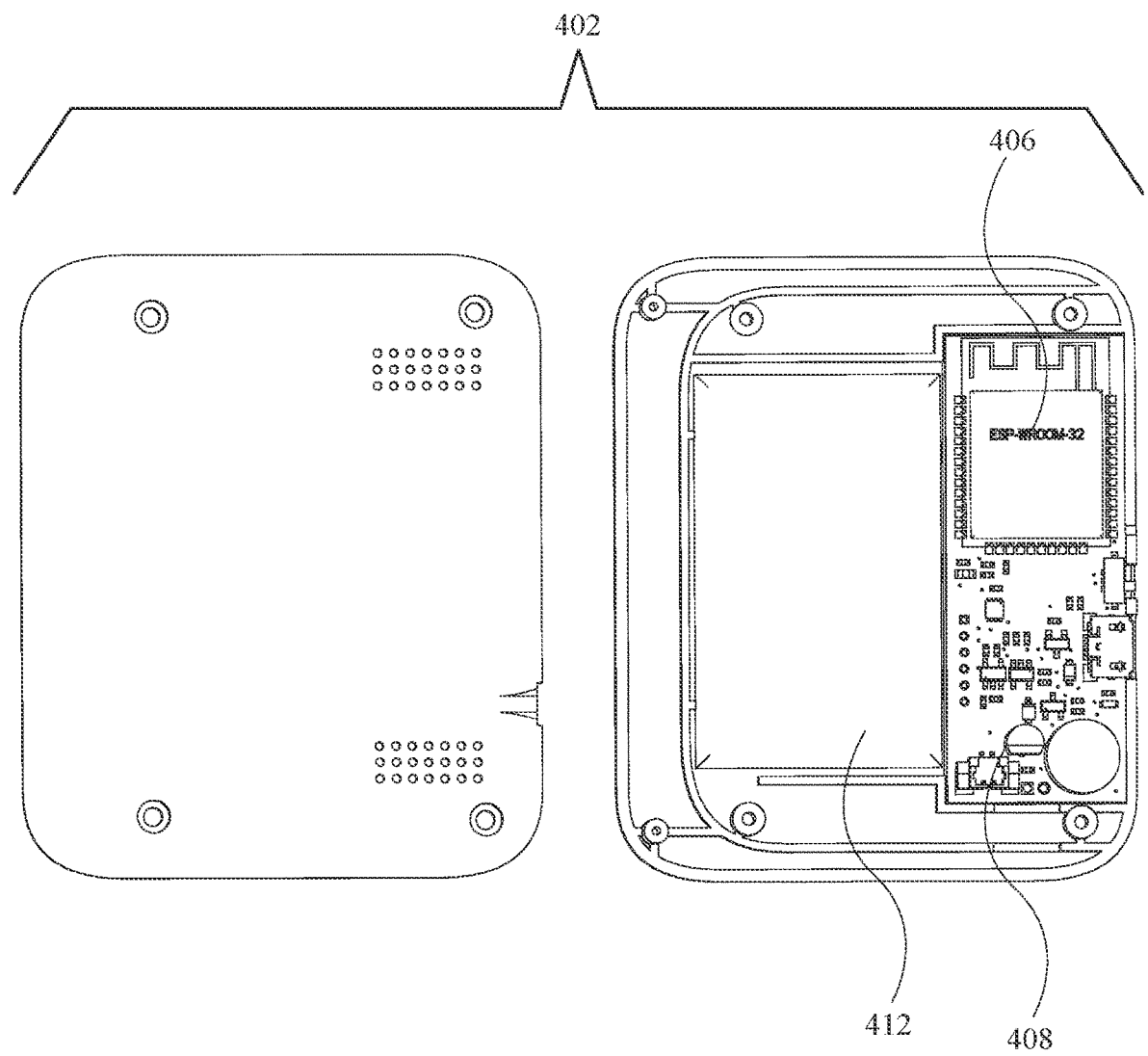
FIG. 17 shows a front view of the pad sensor, showing the internal components of the pad sensor.
Figure 18:
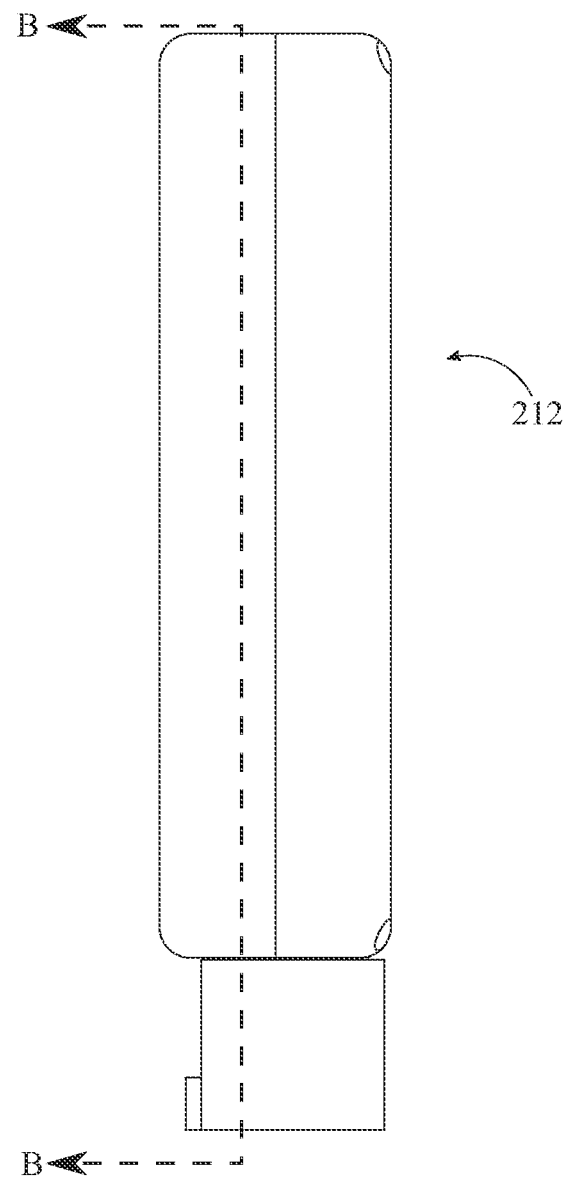
FIG. 18 shows a left side view of the dongle.
Figure 19:
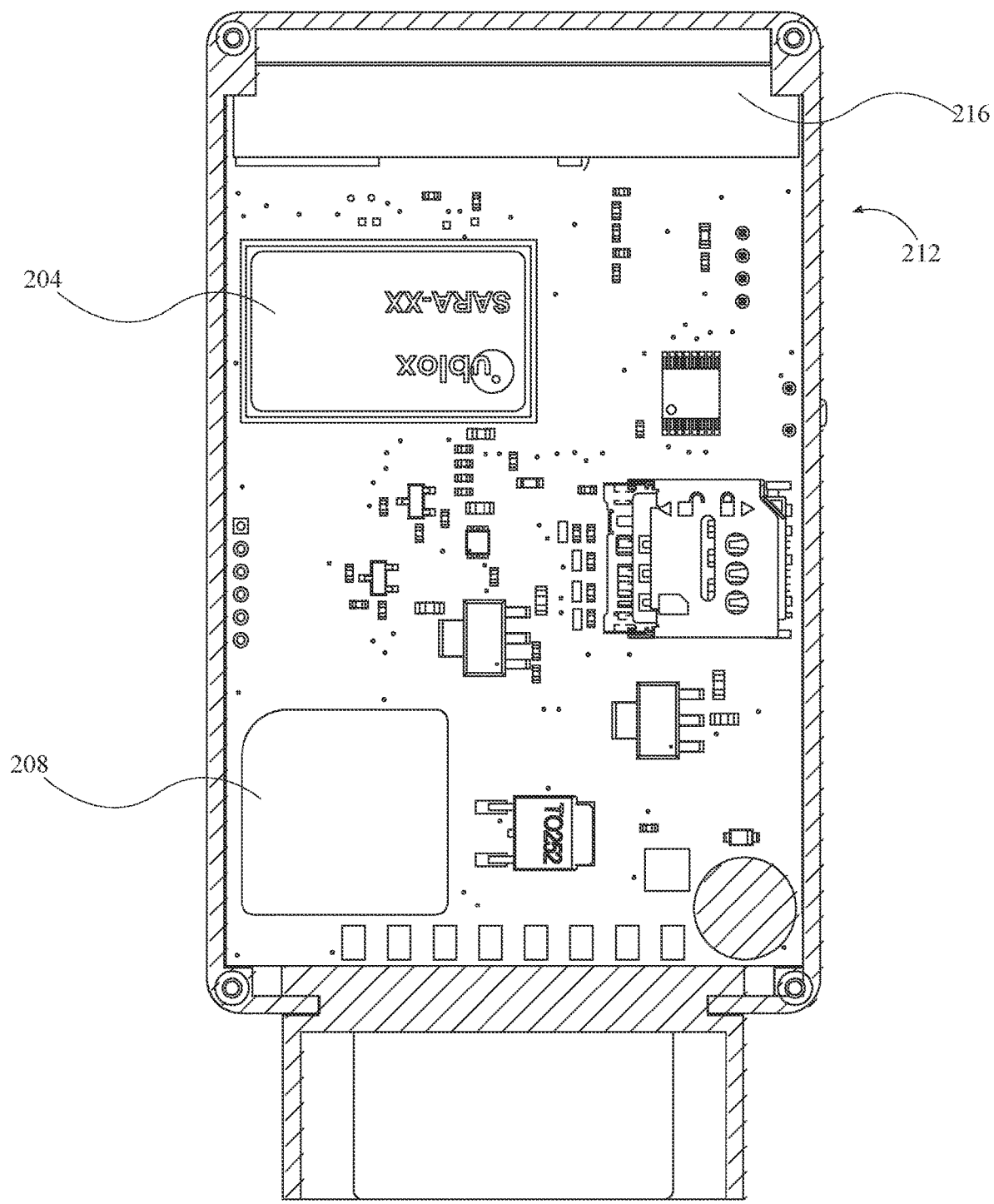
FIG. 19 shows a cross-sectional view of FIG. 18 taken along line B-B.
Figure 20:
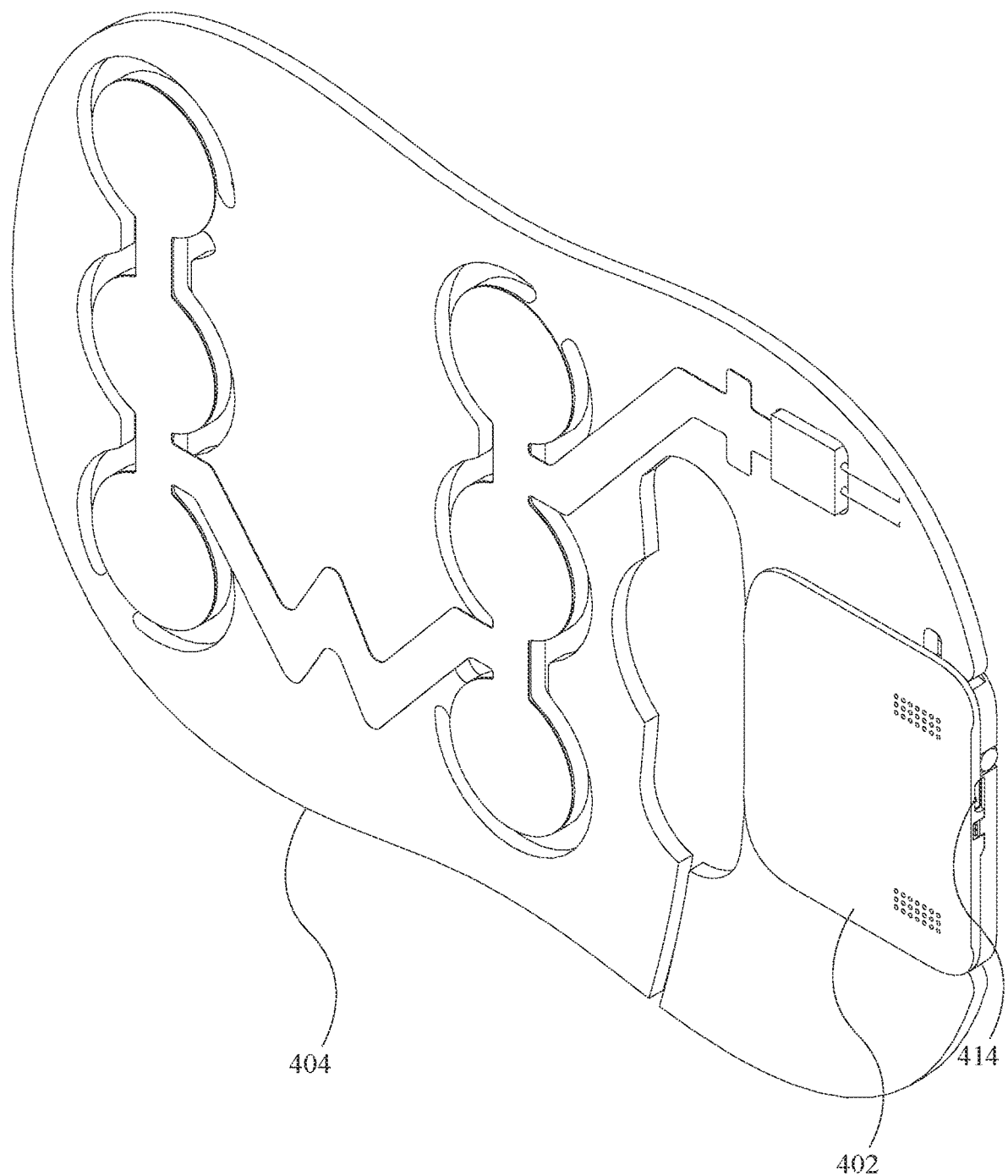
FIG. 20 shows an top front perspective view of the pressure sensor.

Referring to FIG. 17, the software application 302 may further make use of an additional physical pad sensor 402 to assist in determining vehicle occupancy. The pad sensor 402 comprises a communication device 406, a temperature sensor 408, and a battery 412. The communication device 406 may comprise an element such as a modem, a radio access technology component such as LTE-M, or may support other wireless communications technology such as Bluetooth. The communication device 406 is adapted to communicate with the dongle 212, sending information such as the sensor status, the temperature, and the battery level. In one embodiment, the communication device 406 may be directly wired to the dongle 212 to support communication between the dongle 212 and the pad sensor 402. The temperature sensor 408 is adapted to read the temperature of the surroundings and send that information to the communication device 406. The battery 412 serves as the power source for the components of the pad sensor 402.

Referring now to FIG. 17, a pressure sensor 404 may further be included for use with the dongle 212. The pressure sensor 404 is adapted to detect weight from an occupant sitting on the pressure sensor 404 and is designed to detect even the weight of a child or baby. The pressure sensor may have a connection port 414 that is adapted to connect with other devices, such as the dongle 212, either through a physical or wireless connection.

As described in this following section, the words "alerts" and "alarms" should be construed to refer to any combination of alerts and alarms capable of being triggered by both the software application 302 and the dongle 212. This would include push notifications, SMS messages, automated phone calls, and other notifications sent to the user of the software application 302. This would further include the use of any alarms or alerts present in a vehicle itself, such as the horn, car alarm, flashing the lights of the vehicle, or other visual, audible, or sensory alerts to indicate the presence of an unattended occupant in the vehicle.

The phrase "baby car safe" should be construed as referring to the system comprising the dongle 212, the software application 302, any mobile device implementing the software application 302 (though the software application is implemented using the processor 202 of the dongle 212 in the ideal embodiment), and any additional sensors that may be included, such as the pad sensor 402.

Figure 2:
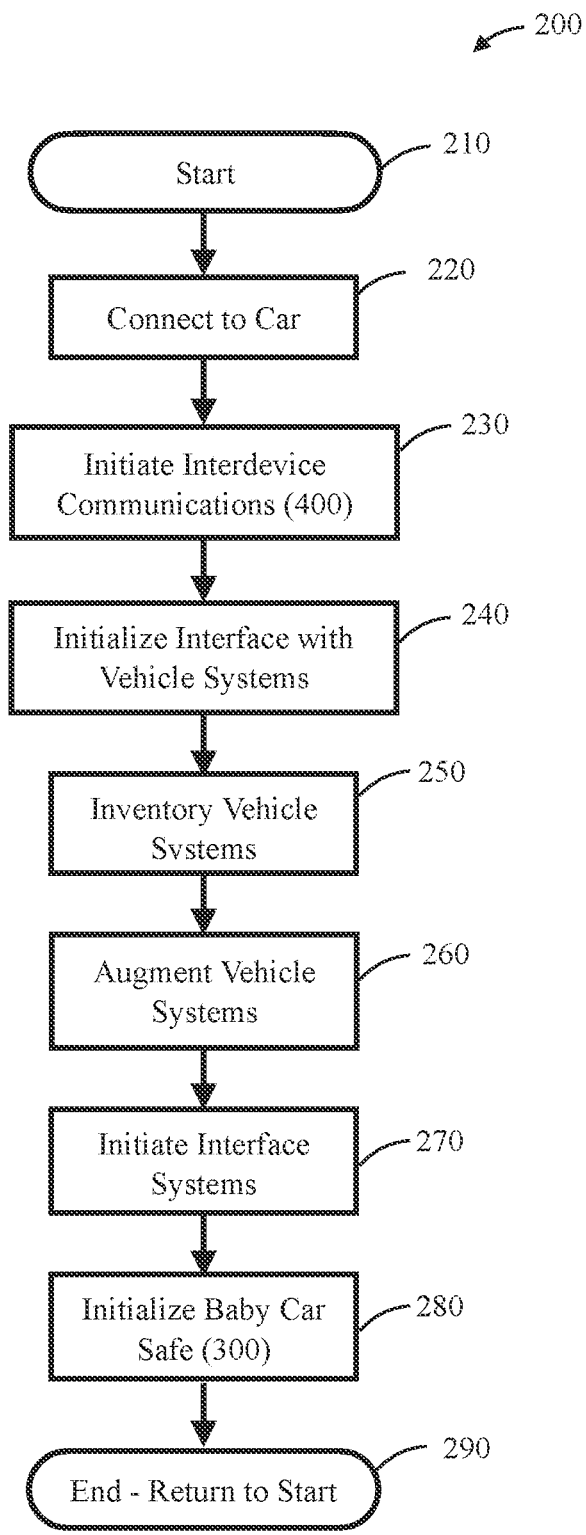
FIG. 2 is a flowchart showing the processes of Docking the Dongle device.

In one embodiment, the software application 302 may be used as follows. As shown in FIG. 1, the method of using the baby car safe starts at Element 110. The first step, or process, in FIG. 2 is Element 120, wherein a Dongle docking (200) operation as shown in FIG. 2, is called and processed. As in FIG. 2, Dongle docking (200) is the operation wherein the dongle 212 of the baby car safe is connected to and provisioned power by a motor vehicle or attached battery, whereupon the dongle 212 then initiates interdevice communications (FIG. 4) and proceeds to initialize operations of the baby car safe so as to enable the baby car safe to prevent a child from being locked inside. The baby car safe can be initialized at the end of the Dongle docking (200) operation as shown in FIG. 2, or as shown in FIG. 1, Element 130, or the Initialize baby car safe (300) operation shown in FIG. 3, wherein the occupancy monitor systems and control systems are initiated. The use of the baby car safe then proceeds to Element 140, the Initiate Interdevice Communications (400) operation as shown in FIG. 4 to initiate and thereby enable the use of the dongle 212 and wireless connectivity needed for the baby car safe to function using the communication component 204 of the dongle 212.

As shown in FIG. 2, Dongle docking (200), starts (Element 210) with the Connect to Car, Element 220, process. The Connect to Car (220) process is the actions needed to connectively attach the dongle 212 of the baby car safe to a motor vehicle. This is done by physically connecting a docking port connector or connection component 206 on the dongle 212 to a docking port of a motor vehicle. Typically the docking port connectors used by the connection component 206 are the same as the vehicle industry's standard device interconnectivity port male-female connectors, but they can be any suitable connector which enables electronic communication between the dongle 212 and all connected systems of the motor vehicle as well as transfer of electric power from the motor vehicle to the dongle 212. If needed, the dongle 212 can be manually wired to the vehicle's connectors. Where there is a power-on test/self-test, this process is conducted as part of the Connect to Car (220) process. Optionally, the docking dongle 212 can interface with motor vehicle via wireless computer connectivity and load the software application 302 of the baby car safe into an available operational location with the motor vehicle's installed systems and functions.

Figure 5:
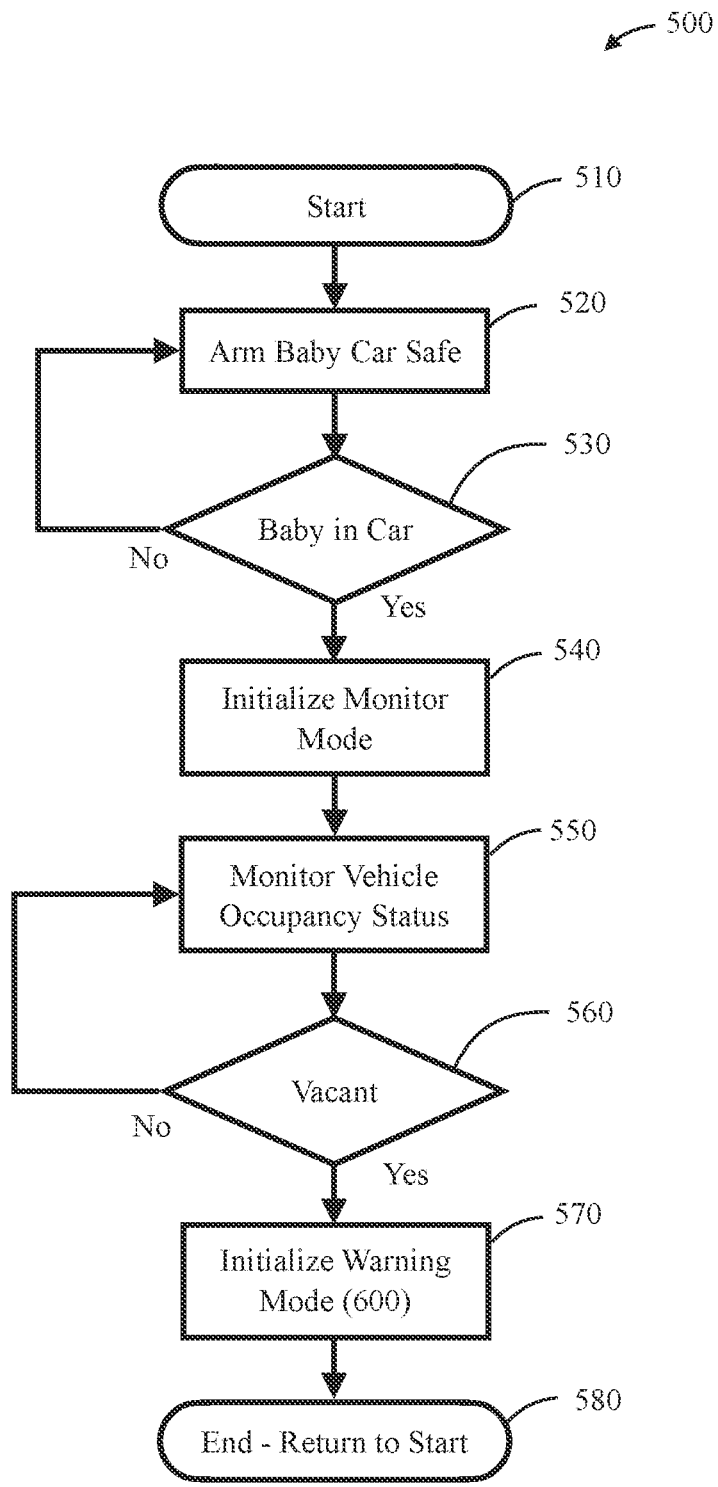
FIG. 5 is a flowchart showing the processes of Initiating Protect Mode.

After interdevice communications are established in FIG. 1, Element 150, the Initiate Protect Mode (500) operation as shown in FIG. 5, is called to function and the baby car safe arms its systems and begins monitoring the motor vehicle and car seat(s) for the presence of a child. If a child is left unattended in the motor vehicle, the Baby car safe then Initiates Warning Mode (600), FIG. 6, wherein a set of timers and conditions are monitored and if breached an escalating series of warnings, alerts, and alarms are issued unless and until the child is no longer left unattended in the motor vehicle.

Figure 4:
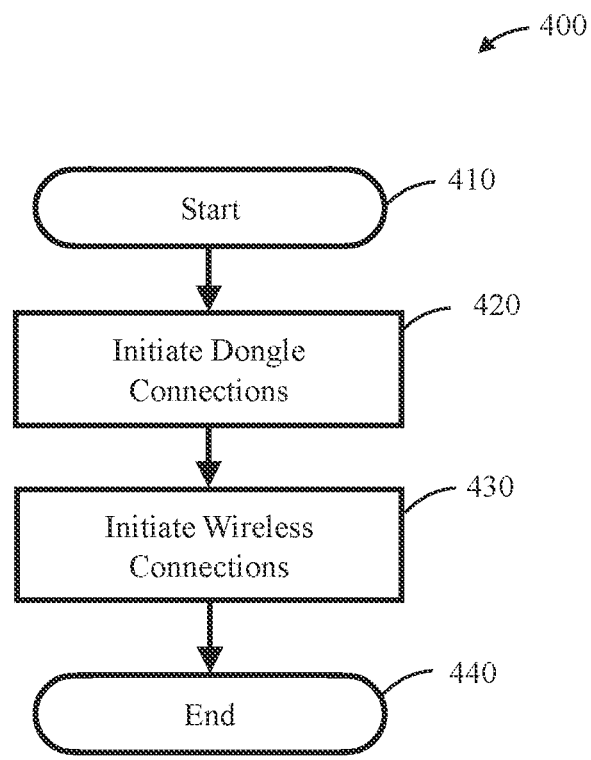
FIG. 4 is a flowchart showing the processes of Initiating Interdevice Communications.

The process of Element 230, as in FIG. 2, is a call into operative functioning the Initiate Interdevice Communications (400) operation shown in FIG. 4. The Initiate Interdevice Communications (400) operation is called to function upon completion of the connection between the dongle 212 and the motor vehicle to initialize the operation of the dongle 212's electronic interface connection with the motor vehicle systems as well as the wireless connectivity to an external smartphone, tablet, or motor vehicle's smart control device using the communication component 204 of the dongle 212.

After communications are initiated between all systems and devices used herein, the Dongle docking (200) operation of FIG. 2 calls into functional operation Element 240, the Initialize Interface with Vehicle Systems process. In the Initialize Interface with Vehicle Systems process (240) the software of the baby car safe polls and conducts interactive communications with all of the electronically interface-able systems of the motor vehicle (see the methods described in steps (a)-(k) above). Optionally where there are not enough sensors for all features and functions for the operation of the baby car safe, the apparatus of the baby car safe may include additional sensing components. This includes, but is not limited to initialization of interfaces with added sensors, such as the addition of a pressure device and infrared device in the car seat, such as the pressure sensor 322, and/or any other sensors to augment the car sensors to allow for detection and better determination of occupation of the motor vehicle by a baby, child, pet, adult, or other occupant.

The Dongle docking (200) operation of FIG. 2 then calls into functional operation the Inventory Vehicle Systems, Element 250, process. The Inventory Vehicle Systems (250) process conducts an electronic inventory of, to include but not be limited to, the door lock systems, the weight, position, thermal, and any other sensor systems, the lights, horn, warning, alarm, and external communications systems, and the navigation, global positioning system interface, and operator/user control/access screens and systems of the motor vehicle. This method is described above in steps (a)-(k) of the present disclosure, to properly map each sensor and system to the appropriate data message and identifier 118. After the motor vehicle systems are polled and inventoried, the Inventory Vehicle Systems (250) process conducts a comparison of the available systems to include the functional capacities of the systems with the list of systems and functions needed for operation of the baby car safe. Key systems, sensors, and devices are identified that can be used to build software rulesets to monitor occupancy, baby presence, and other occupancy conditions that then are monitored to determine when the baby or child is left unattended. This process may either be done manually by the user using the software application 302, or the software application 302 may be configured to automatically map the available sensors. Furthermore, environmental conditions are monitored to identify if there are other health or life threatening conditions that may exist. These include, but are not limited to the following: interior temperature, airbag deployment, panic alarm manual activation, shock sensor/accelerometer activation, and motion sensing.

The list of systems and functions needed includes, but is not limited to, the capacity to do these: electronically unlock the doors of the motor vehicle, electronically sense the presence of a child in a car seat, electronically sense the absence of any other person within the motor vehicle, and electronically communicate with external smart devices and internet based interfaces. Where the motor vehicle does not have the requisite systems available, the baby car safe can include a remote device including, but not limited to, a plurality of sensors and wireless interface connectivity devices that can augment the systems of the motor vehicle to ensure that all needed systems and functions are available for interface and use by the baby car safe. The internal power source of said remote device may be optionally rechargeable with a wired or wireless interface. For example, if a vehicle lacks sensors that correspond to the rear doors, the remote device could include a plurality of sensors that correspond to the state of the rear doors, the sensors being configured to send the status of the doors to the dongle 212.

Other motor vehicle systems and functions include, but are not limited to, rolling windows down, starting car, turning air conditioning/heat on, keeping power applied to the car's computer, honking the horn, flashing the external lights, turning on and off the internal lights, and any other capacity of the motor vehicle capable of making a warning, alarm, or notification.

Where the inventory process has recorded that the motor vehicle lacks certain needed systems and/or functions, the Dongle docking operation (200) calls into functional operation the Augment Vehicle Systems process shown as Element 260 in FIG. 2. The Augment Vehicle Systems process (260) uses the recorded inventory of the motor vehicle to add to or compliment the available systems and functions of the motor vehicle with external systems and functions as needed. The remote device can provide the needed systems and functions to ensure the full and proper operation of the baby car safe either alone, or in combination with the systems and functions of the motor vehicle. It is noted that the baby car safe remote device may be configured with and connected to externally applied devices and connections to provide any and all needed systems and functions, as listed above, and may include wired connectivity to external physical or mechanical actuators as needed to provide any and/or up to all of the necessary systems and functions for the full operation of the baby car safe.

After system and function inventory and augmentation as needed, the Dongle docking operation (200) calls into functional operation the Initiate Interface Systems process, shown as Element 270 in FIG. 2. The Initiate Interface Systems process (270) opens, and then maintains as needed, electronic interchange, messaging, and control signaling between the dongle 212 and software application 302 of the baby car safe and the systems and functions of the motor vehicle from the control unit 100 so as to enable the full and complete operation of the baby car safe. In this way, the dongle 212 continuously communicates with the control unit 100 of the vehicle, while maintaining communication with the software application 302.

Figure 3:
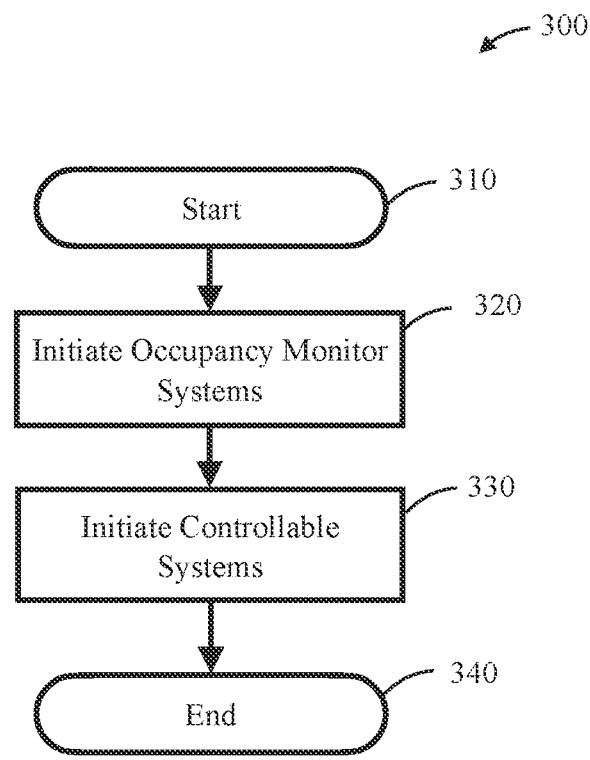
FIG. 3 is a flowchart showing the processes of Initializing the Baby Car Safe.

Once all systems and functions needed are available and interfaced for operation of the baby car safe, the Dongle docking operation (200) calls into functional operation the Initialize baby car safe operation (300) as shown in FIG. 3.

It is noted, that the baby car safe dongle 212 may be optionally configured so as to include, but not be limited to, any and/or all systems and functions needed for the full and complete operation of the baby car safe presented herein without connectivity to or dependence upon any external device. For example, where the motor vehicle includes all systems and functions needed for the full and complete operation of the baby car safe, the dongle 212 device component of the baby car safe alone may be configured so as to fully enable the prevention of a child left unattended in the motor vehicle. However, if a vehicle lacks necessary functions, the dongle 212 may either provide those functions—such as by further comprising built in sound generators for alarms—or such components may be provided separately by the user.

As shown in FIG. 2, Element 280, the last process brought into functional operation by the Dongle docking operation (200) is the Initialize Baby car safe operation (300) as shown in FIG. 3. Element 290 is the End of the Dongle docking operation (200).

The Initialize baby car safe operation (300) start, Element 310, shown in FIG. 3, starts the Initialize Baby car safe operation (300) by calling into functional operation the software features and functions that comprise the Initiate Occupancy Monitoring Systems, Element 320 in FIG. 3. The Initiate Occupancy Monitor Systems process (320) calls into functional operation the polling and data interchange needed between the baby car safe and the systems and functions of the motor vehicle and any externally wirelessly connected smart device capable of running the baby car safe software application 302 to ensure the full and complete operability of the baby car safe to monitor whether or not a child is present in any car seat of the motor vehicle and whether or not there is another person occupying the motor vehicle with a child when present in any car seat within the motor vehicle. The dongle 212 monitors the signals corresponding to the previously mapped sensors in steps (a)-(k) to process input and apply to the baby car safe determination of occupancy status of the vehicle.

After initiation of the Occupancy Monitoring Systems (320), the Initialize baby car safe operation (300) calls into functional operation the software application 302 features and functions that comprise the Initiate Controllable Systems process shown as Element 330 in FIG. 3. The Initiate Controllable Systems process (330) is responsible for opening and maintaining the polling and data interchange needed between the baby car safe and the systems and functions of the motor vehicle so as to enable the baby car safe to exercise control over the door lock, warning, alarm, alert, lights, and horn systems of the motor vehicle or augmenting systems and functions. This step is performed using the dongle 212. The dongle 212 maintains polling and data interchange with the control unit 100 using the message identifiers 118 and data decipher during steps (a)-(k).

The Initialize Baby car safe operation (300) end, Element 340, shown in FIG. 3, ends the Initialize Baby car safe operation (300) but leaves open the monitoring and control systems for use by the baby car safe. The dongle 212 continues to monitor the data stream 102 being sent from the control unit 100 of the vehicle.

The Initialize Interdevice Communications operation (400) start, Element 410, shown in FIG. 4, starts the Initialize Interdevice Communications operation (400) by calling into functional operation the software features and functions that comprise the Initiate Dongle Connections process, Element 420 in FIG. 4. The Initiate Dongle Connections process (420) comprises, but is not limited to, the software features and functions needed to open, poll, and begin electronic interchange of data and exercise of control over systems and functions by the Baby car safe as between the dongle 212 of the baby car safe and any and/or all systems and functions from the motor vehicle, and any external baby car safe remote device. This function is performed using the communication component 204 of the dongle 212 to communicate with any external remote device, and using the connection component 206 of the dongle 212 to maintain connection with the control unit 100 of the motor vehicle to communicate with any systems or functions of the motor vehicle.

The Initiate Dongle Connections process (420) exits into the Initiate Wireless Connections process shown as Element 430 in FIG. 4. The Initialize Interdevice Communications operation (400) uses the Initiate Wireless Connections process (430) software features and functions so as to open, poll, and begin electronic interchange of data and exercise of control over systems and functions needed by the baby car safe between the baby car safe and any wirelessly connected smart devices available for use and capable of running the software application 302 of the baby car safe. The Initiate Wireless Connections process (430) is implemented using the communication component 204 of the dongle 212 to communicate with any external remote device, and using the connection component 206 of the dongle 212 to maintain connection with the control unit 100 of the motor vehicle to communicate with any systems or functions of the motor vehicle.

The Initialize Interdevice Communications operation (400) end, Element 440, shown in FIG. 4, ends the Initialize Interdevice Communications operation (400) but leaves open the connections established for use by the baby car safe for its full and complete operation.

The Initiate Protect Mode operation (500) shown in FIG. 5 starts with Element 510 starting the functional operation of the Arm Baby car safe process, Element 520. The Arm Baby car safe process (520) powers on all devices associated with the Baby car safe to include, but not be limited to, any and/or all systems and functions from the motor vehicle, any external Baby car safe remote device, and any wirelessly connected smart device. The Arm Baby car safe process (520) is implemented using the communication component 204 of the dongle 212 to communicate with any external remote device, and using the connection component 206 of the dongle 212 to maintain connection with the control unit 100 of the motor vehicle to communicate with any systems or functions of the motor vehicle.

The Initiate Protect Mode operation (500) shown in FIG. 5 then moves into determining whether or not a child is occupying any car seat within the motor vehicle wherein the Baby car safe has been implemented. This action is shown as the decision box Element 530 in FIG. 5. When the Initiate Protect Mode operation (500) determines that there is a baby occupying any car seat of the motor vehicle, it calls into functional operation the software features and functions of the Initialize Monitor Mode process, Element 540 of FIG. 5. The Initialize Monitor Mode process (540) calls into functional operation the software features and functions of the baby car safe as needed to continuously poll, check, and update the controls of any and all connected systems and functions as so to provide continuously updated data element determination as to whether or not there is a baby in any car seat and whether or not there are any other persons occupying the motor vehicle. The Initialize Monitor Mode process (540) is implemented using the communication component 204 of the dongle 212 to communicate with any external remote device, and using the connection component 206 of the dongle 212 to maintain connection with the control unit 100 of the motor vehicle to communicate with any systems or functions of the motor vehicle. The relevant sensors corresponding to occupancy were previously identified during steps (a)-(k), described above, with the map of the sensor status 132.

Once Monitor Mode is initialized, the Baby car safe Initiate Protect Mode operation (500) is then continually monitoring the occupancy of the motor vehicle as shown in Element 550 of FIG. 5. Once Monitor Mode is initialized, the Initiate Protect Mode operation (500) calls into functional operation the software features and functions of the Monitor Vehicle Occupancy Status process (550). The Monitor Vehicle Occupancy Status process (550) continuously provides occupancy status as to baby and any other persons so that the Initiate Protect Mode operation (500) can determine whether there is a baby present alone in the motor vehicle as shown in Element 560 of FIG. 5. The software application 302 performs this process by monitoring the relevant signals from the map of sensor status 132 previously obtained in steps (a)-(k).

Figure 6:
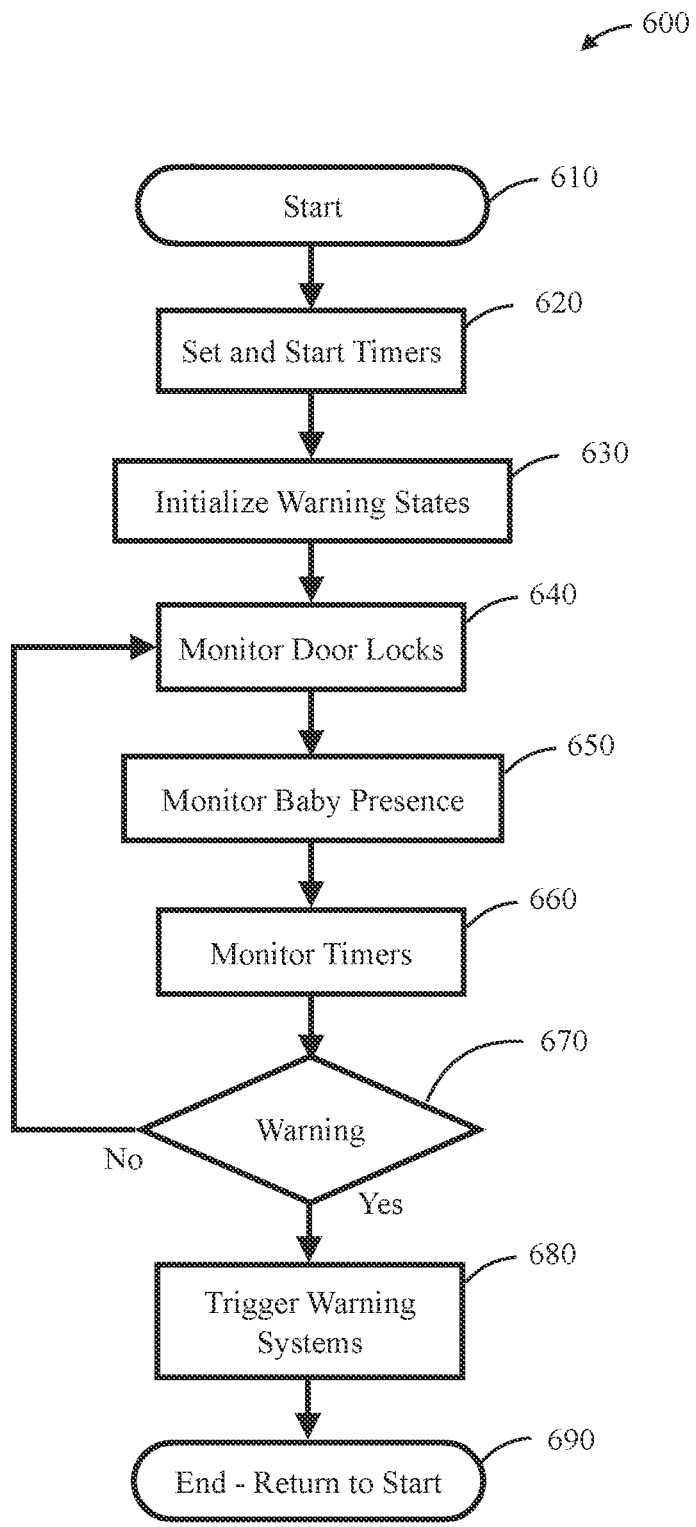
FIG. 6 is a flowchart showing the processes of Initiating Warning Mode.

If there is a baby present in the motor vehicle and the vehicle has no other occupants, the Initiate Protect Mode operation (500) calls into functional operation the software features and functions of the Initialize Warning Mode operation (600) shown FIG. 6, as shown in Element 570 of FIG. 5. Element 580 of FIG. 5 the End or Return to start of the Initiate Protect Mode operation (500) which remains in operation unless and until there is no unattended baby seated in a car seat within the motor vehicle. The Initialize Warning Mode operation (600) as shown in FIG. 6 starts with the Start, Element 610, calling into functional operation the software features and functions of the Start and Set Timers process, Element 620. The Start and Set Timers process (620) starts and sets a plurality of timers for use by the Baby car safe in providing and escalating alerts, warnings, alarms, and automated calls for assistance to public safety, police, and fire response agencies. The timers remain continuously updated by the Baby car safe operations and processes. The software application 302 may use the communication component 204 of the dongle 212 to send such alerts to emergency services, or may use the communication components of the mobile device upon which it is installed (such as a smartphone's calling or text functionality). The alarms triggered may comprise push notifications, texts, calls, or other audio or visual alerts sent to the associated mobile device of the user using the communication component 204 of the dongle 212, or by using the software application 302 to send or trigger such alarms.

Additionally, the alarms triggered may comprise the car alarm, flashing the lights, honking the horn, or making use of other existing system in the vehicle. The vehicle alarms may be triggered using the connection component 206 of the dongle 212 to send the corresponding identifier 118 and message data 134 to trigger the alarm. Once the timers are set, the Initialize Warning Mode operation (600) calls into functional operation the software features and functions of the Initialize Warning States processes shown as Element 630 in FIG. 6. The Initialize Warning States processes (630) sets the initial warning and escalation data elements for comparative reference use by any and all parts of the baby car safe.

The Initialize Warning Mode operation (600) then calls into functional operation the software application 302 features and functions of three processes to monitor the door locks, the presence of a baby, and timers. As shown in FIG. 6, Element 640 is the Monitor Door Locks process, Element 650 is the Monitor Baby Presence process, and Element 660 is the Monitor Timers process. This combination of processes are operated so that the Initialize Warning Mode operation (600) can determine whether or not a Warning should be issued, as shown in Element 670 of FIG. 6. These three processes are implemented by monitoring the data stream 102 from the control unit 100 using the dongle to identify the status of the door locks and the presence of a passenger. The software application 302 monitors the status of the timers.

If the Initialize Warning Mode operation (600) determines that a warning, alert, alarm, automated call, or other electronically controllable notice system notice should be issued, it then calls into functional operation the Trigger Warning Systems process, Element 680 in FIG. 6. The Trigger Warning Systems process (680) includes, but is not limited to, the issuance of any suitable warning, alert, alarm, automated call, or other electronically controllable notice system notice as needed to ensure that no baby or child is left unattended in any car seat within the motor vehicle. As described previously, the software application 302 may use the communication component 204 of the dongle 212 to send such alerts to emergency services, or may use the communication components of the mobile device upon which it is installed (such as a smartphone's calling or text functionality). The alarms triggered may comprise push notifications, texts, calls, or other audio or visual alerts sent to the associated mobile device of the user using the communication component 204 of the dongle 212, or by using the software application 302 to send or trigger such alarms. Additionally the alarms triggered may comprise the car alarm, flashing the lights, honking the horn, or making use of other existing system in the vehicle. The vehicle alarms may be triggered using the connection component 206 of the dongle 212 to send the corresponding identifier 118 and message data 134 to trigger the alarm.

The Initialize Warning Mode operation (600) ends, as shown in Element 690 by ending operations as no baby or child has been left unattended, or by returning to the start of the Initialize Warning Mode operation (600) to continue operation of the Baby car safe.

Another embodiment of the software application 302 may operate as seen in FIGS. 9-12. In this embodiment, the software application 302 may interface with the dongle 212 or other processing device in a vehicle to receive a data stream 102 from the vehicle control unit 100. In the following paragraphs, the word "system" should be interpreted to refer to the combination of the dongle 212, the software application 302, and any device being used to implement the software application 302, such as using the processor 202 on the dongle 212.

There are two primary functional features that are the core of the baby car safe system. These are Anti-Abandonment and Unattended Access. Pediatric Vehicular Heatstroke from Abandonment and kids locking themselves in cars (unattended access), are briefly described in the opening background information—these functions aim to prevent this.

Anti-abandonment and unattended access operate with modes. These modes include Offline/Boot, Standby, Watch, Guard, Alert, and Alarm. Alerts and Alarms may be accompanied by push notifications, SMS text, and interactive voice response (IVR) automated calls. They may also trigger vehicle horn sounding, headlights flashing, or other signaling.

The alerts and alarms are intended to notify the guardians, designated contacts, and if necessary emergency services that a child is in danger and needs to be rescued. To quickly and accurately guide contacts and rescue personnel to the vehicle with the emergency situation, key information is provided to them in a digital format. This includes but not limited to, GPS coordinates, clickable GPS coordinate link in the Push and SMS Text messages, vehicle description to include VIN number, make, mode, year, color, vehicle license plate number. Status of the vehicle sensors such as transmission in park, interior cabin temperature, child's name and age, and guardian contact information.

Because not all alarms are actual emergencies, the automated calls are interactive voice response calls that allow the user to speak or key in responses to emergency questions. The user may have the option to cancel the alarm, request a rescue team, or connect to live support.

Figure 11:
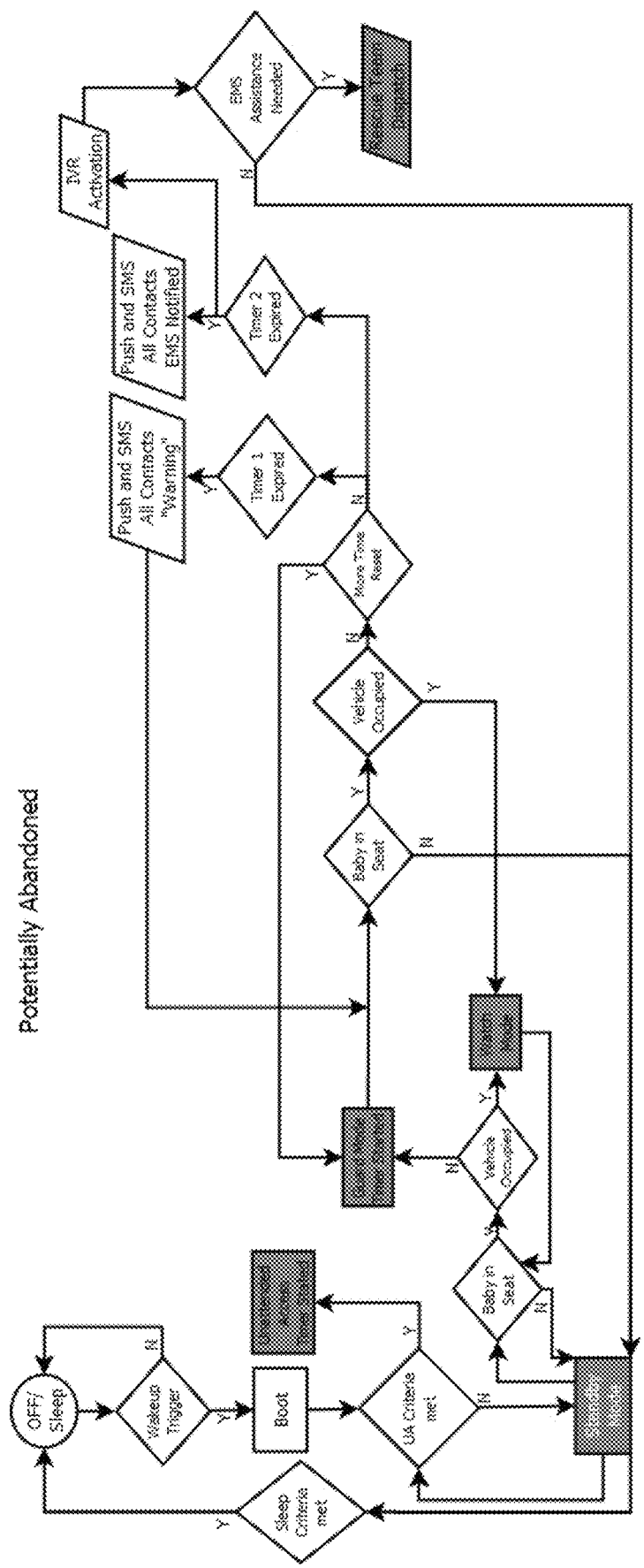
FIG. 11 shows a flowchart of an embodiment of the anti-abandonment method.

FIG. 11 shows a flowchart demonstrating an anti-abandonment algorithm implemented by the software application 302. In the anti-abandonment algorithm, the system operates by modes. Typically it begins in an offline or boot mode— the system waits for a trigger to begin activation. A trigger can be any ECU databus spike in activity, motion sensors, or other presence sensing feature. If a suitable trigger is found to wakeup the system the system boots up, power is provided to the dongle 212, and the system enters standby, watch, or unattended access alert mode as determined by the algorithm.

In standby mode, the system continuously monitors the data stream 102 from the control unit 100. If the system identifies data from the data stream 102 (mapped ECU data) that indicates a predetermined criteria for entering unattended access mode has been met the system will enter unattended access mode (described in more detail below). Unattended access mode criteria includes but is not limited to absence of an authorized wireless mobile device and vehicle access points status change such as door opens, window opens.

In standby mode, the system will further monitor the data stream 102 from the control unit 100 and attached sensors such as a baby sensor pad, to determine if there is a baby in the seat, and if the vehicle is occupied. If a baby is not in the seat, the system remains in standby mode. If a baby is in the seat, the system will check the data stream 102 to determine if the vehicle is occupied.

If the vehicle is occupied, the system will enter watch mode, and wait until the data stream 102 from the control unit 100 indicates that the driver and or other occupants are about to exit the vehicle. In watch mode, the system waits for and anticipates a state change that indicates when the driver is about to exit the vehicle. For example, this system may read the data stream 102 to identify messages that may indicate the driver has put the vehicle in park, opened the door, removed the driver's seatbelt, or other sensor statuses that may indicate the driver is about to exit the vehicle, then enters guard mode. At this point, the system may issue alerts or alarms to the user using the alerts and alarms on the vehicle or mobile device to remind the user not to leave the baby or infirmed passenger of the vehicle unattended. In the ideal embodiment, audible chimers and LED visual signals are used to alert the occupants that the baby is being guarded by baby car safe and the child should be removed before occupants leaves the vehicle.

If there is a baby or infirmed passenger that remains in the car while the vehicle is unoccupied, the system remains in guard mode. During guard mode, the system starts one or more timers—in the ideal embodiment, two timers are used. If the baby or infirmed passenger remains unattended within the vehicle past the designated time, the system will begin to issue alerts. Once the first timer expires, the system sends out push notifications to the user, and may trigger SMS Text messages and automated phone calls (IVR) to user of the device last connected to the dongle. Optionally other contacts may receive the alerts. In the ideal embodiment, a reset timer feature is available to the user to allow them to reset the timer to start over. This allows users flexibility in managing normal activities requiring more time before removing the child from the car seat.

If the second timer expires, the system enters alarm mode and will similarly send out a second round of push notifications, SMS Message, and automated calls to the user of the device last connected to the dongle. Optionally other contacts may receive the alerts. In the ideal embodiment, a reset timer feature is available to the user to allow them to reset the timer to start over. This allows users flexibility in managing normal activities requiring more time before removing the child from the car seat.

The expiration of this timer may further trigger a message or phone call to emergency services. The message may contain helpful information taken from the vehicle's sensors, including the vehicle's GPS location, make and model, and any other information suitable to help emergency responders identify the vehicle and the vehicle's location, as described above. If multiple timers are set, the alerts and alarms may gradually escalate between the triggering of each timer. For example, the first alert or alarm may comprise honking the horn and sending an SMS message. The second alert or alarm may further comprises honking the horn, flashing the lights, setting off the car alarm, and sending both calls and SMS messages.

When issuing alerts, the system may further make use of the map of the sensor status 132 previously obtained in steps (a)-(k) to mitigate dangerous conditions. Such mitigation measures may include sending messages to the control unit 100 of the vehicle to lower the windows, turn on the air conditioning, unlock the doors, or other similar methods to ensure the occupant does not suffer heat stroke.

Figure 10:
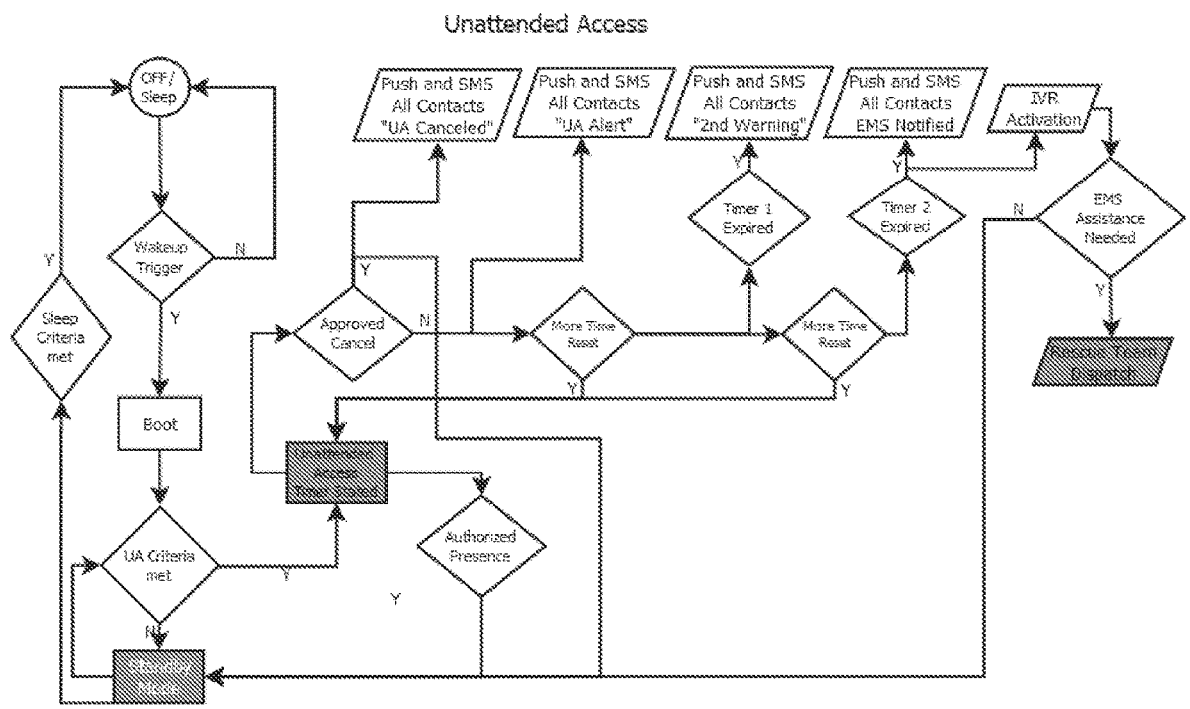
FIG. 10 shows a flowchart of an embodiment of the unattended access prevention method.

The software application 302 further has an unattended access mode to detect unattended access of the vehicle, as seen in the flowchart in FIG. 10.

The system begins in an offline or boot mode—the system waits for a trigger to begin activation. If a suitable trigger is found to wakeup the system—such as booting up the vehicle—the system boots up, power is provided to the dongle 212, and the system enters standby mode.

Once in standby mode, the system will monitor the data stream 102 from the control unit 100 until some messages are received that indicate the criteria to trigger unattended access mode have been met. Such criteria may include any indication that a person has obtained unauthorized access to the vehicle. For example, the system may monitor for the opening of doors, rolling down or breakage of windows, the presence of an individual as indicated by pressure sensors in the seats, or other similar criteria. The system may further monitor to determine if the access was authorized. If for example, an associated device, such as a key or key fob, is detected by the system, or a paired mobile device, then the entry may be treated as authorized and the system will transition to anti-abandonment mode (described above) or return to standby mode as determined by the anti-abandonment algorithm.

Once unauthorized access is detected, the system triggers a timer that lasts until either the unattended access mode is manually cancelled, or an authorized presence is detected within the vehicle, as described above.

Once a certain time has elapsed from the timer, the system may issue warnings and alerts, similar to the anti-abandonment mode described above. In the ideal embodiment, the system issues alerts at four separate intervals. At each of the first three intervals, the system issues push notifications, SMS messages to designated contacts, and may issue other alarms and alerts as necessary. Once the fourth interval is reached, the expiration of this fourth interval timer may further trigger a message or phone call to emergency services. The message may contain helpful information taken from the vehicle's sensors, including the vehicle's GPS location, make and model, and any other information suitable to help emergency responders identify the vehicle and the vehicle's location. If multiple timers are set, the alerts and alarms may gradually escalate between the triggering of each timer. For example, the first alert or alarm may comprise honking the horn and sending an SMS message. The second alert or alarm may further comprises honking the horn, flashing the lights, setting off the car alarm, and sending both calls and SMS messages.

Figure 12:
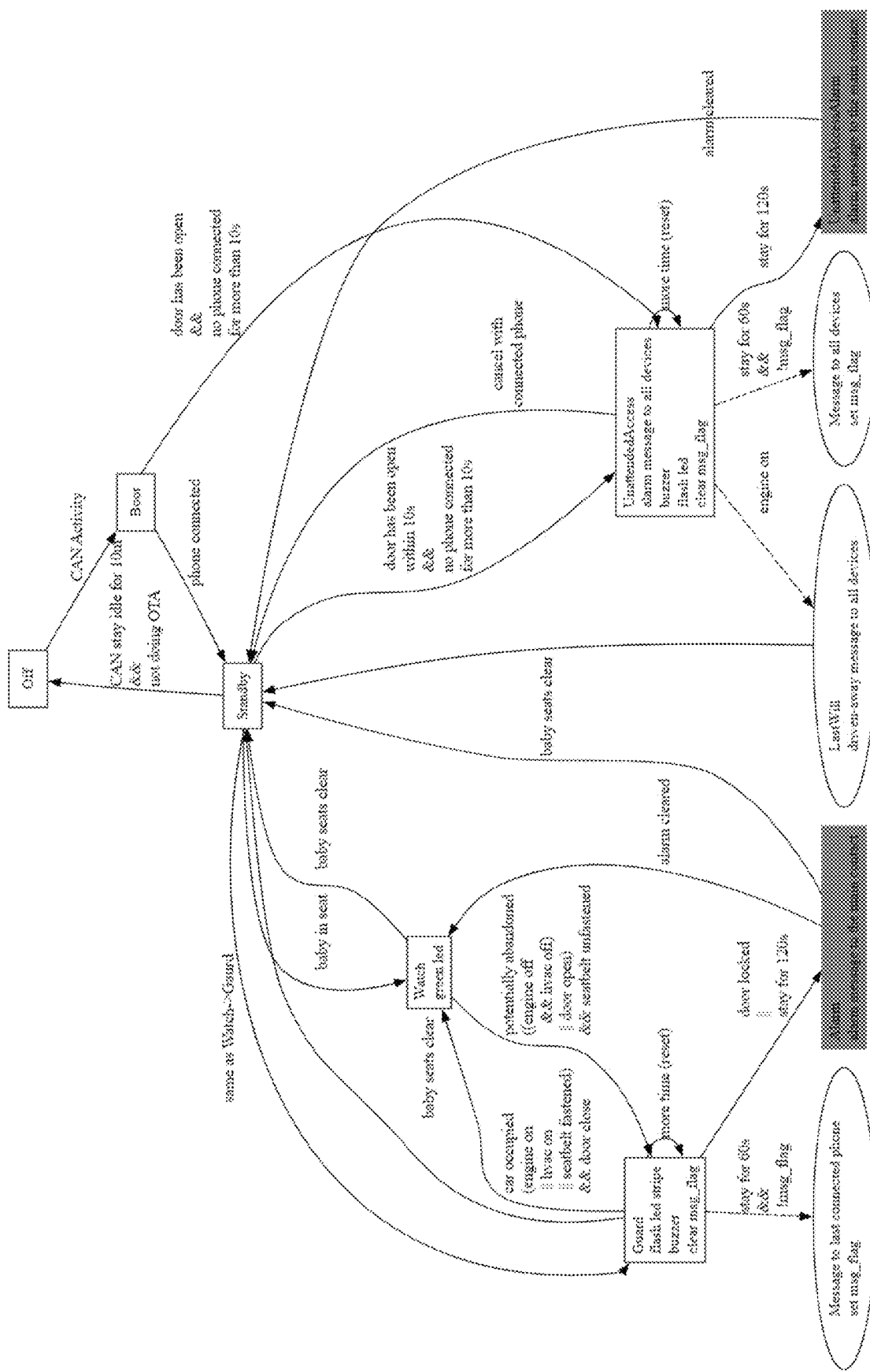
FIG. 12 shows a flowchart of an example implementation of the anti-abandonment and unattended access prevention methods.
Figure 13:
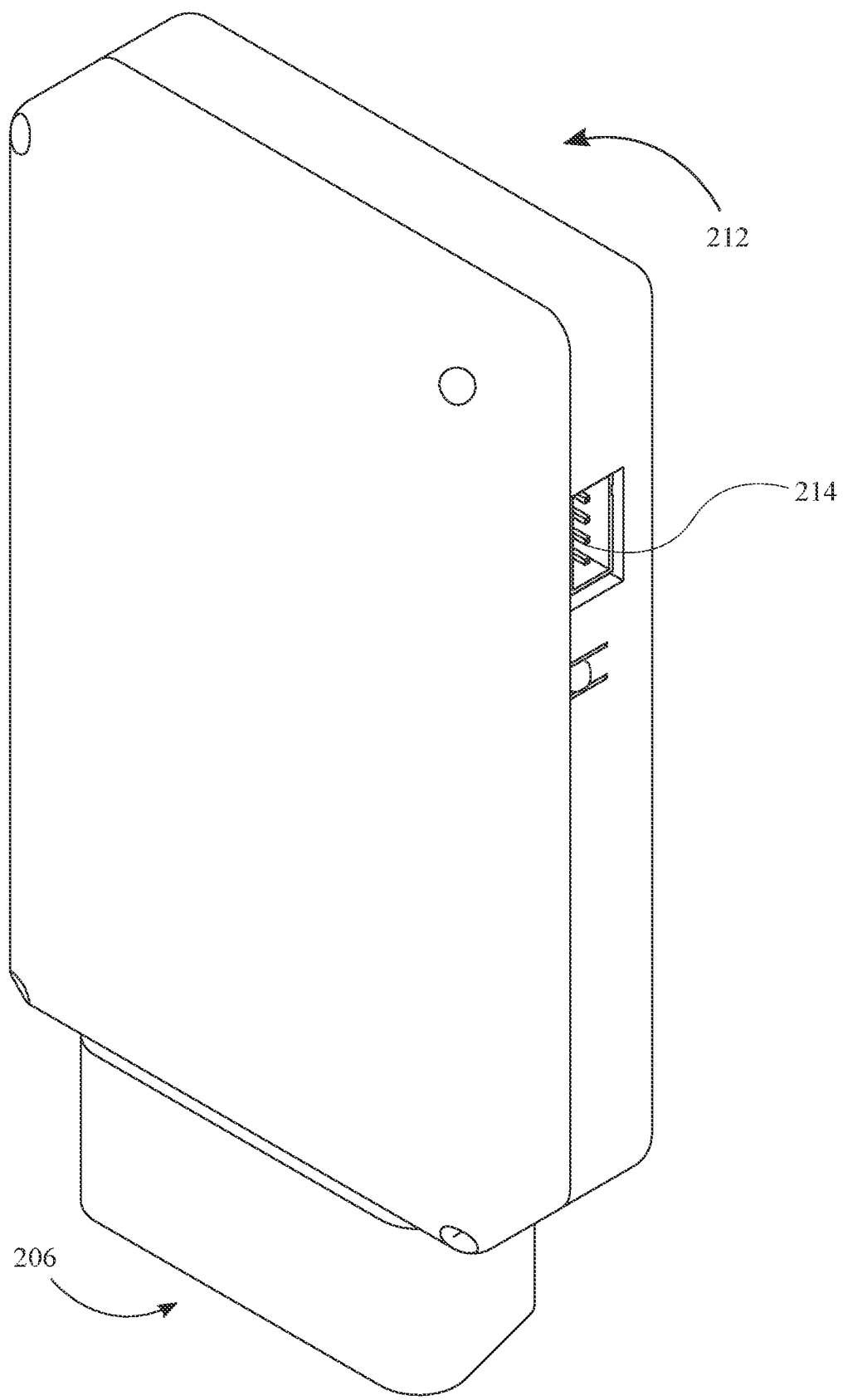
FIG. 13 shows an top front perspective view of the dongle.

FIG. 12 shows an example implementation in flowchart form of the anti-abandonment and unattended access systems and methods.

In this way, the system is capable of monitoring the plurality of states possible for occupancy of a vehicle, and alerting the user appropriately to any changes in conditions that may indicate the presence of an unattended passenger in the vehicle to prevent any harm caused by heatstroke or similar concerns.

Although the invention has been explained in relation to its preferred embodiment, it is to be understood that many other possible modifications and variations can be made without departing from the spirit and scope of the invention.

What is claimed is:

1. A method for deciphering and mapping signals from a control unit, the method comprising:
    a. Accessing a data stream from the control unit;
    b. Continuously downloading the data stream from the control unit;
    c. Initializing a negative mask list, a positive mask list and a candidate list;
    d. Ensuring a targeted sensor is not in use;
    e. Building the negative mask list;
    f. Exercising a targeted sensor;
    g. Receiving a sensor signal from the targeted sensor;
    h. Building the positive mask list;
    i. Building the candidate list;
    j. Repeating steps (a)-(i) to narrow the candidate list; and
    k. Mapping a sensor status with the relevant candidate in the candidate list to create a map of the sensor status.

2. The method of claim 1, wherein accessing the data from the control unit further comprises:
    identifying the speed and protocol being used by the control unit; and
    adapting a processor to receive the data stream from the control unit.

3. The method of claim 2, wherein:
    the processing unit comprises a dongle;
    the dongle further comprising a processor, a communication component, and a connection component; and
    wherein the connection component is adapted to connect to the control unit.

4. The method of claim 3, wherein:
    the control unit is the electronic control unit of a vehicle;
    the connection component of the dongle is adapted to connect to the electronic control unit of the vehicle; and
    the step of identifying the speed and protocol being used by the control unit further comprises using a rotating access query to cycle through a list of specified data rates and protocols until a supported connection is found.

5. The method of claim 1, wherein the candidate list further comprises:
    a list of potential candidates comprising at least one candidate; and
    each candidate in the list of potential candidates being associated with an identifier, a positive mask, and a negative mask.

6. The method of claim 5, wherein building the negative mask list further comprises:
    identifying one or more changing data for each identifier;
    marking the one or more changing data for each identifier in the negative mask list; and
    updating the negative mask associated with each identifier in the candidate list to contain the data from the negative mask list.

7. The method of claim 6, wherein building the positive mask list further comprises:
    identifying one or more changing data for each identifier;
    marking the one or more changing data for each identifier in the positive mask list; and
    updating the positive mask associated with each identifier in the candidate list to contain the data from the positive mask list.

8. The method of claim 7, wherein building the candidate list further comprises:
    for each identifier in the candidate list, combining the negative mask and the positive mask to create a combined mask; and
    for each candidate in the candidate list, removing the candidate if the combined mask is null.

9. The method of claim 8, wherein mapping the sensor status with the relevant candidate in the candidate list to create a map of the sensor status further comprises:
    exercising the targeted sensor;
    observing one or more altered data in the data stream from the control unit when the targeted sensor is exercised; and
    mapping the altered data to correspond to the state of the sensor.

10. The method of claim 1, further comprising:
    inserting a delay after exercising the targeted sensor and receiving signals from the targeted sensor; and
    continuing to build the positive mask list during the delay.

11. The method of claim 3, further comprising:
    a software application being adapted to receive the map of the sensor status;
    the software application being adapted to use the system of the vehicle to identify the presence of a person within the vehicle using the map of the sensor status;
    the software application being configured to operate the sensors of the vehicle based on the map of the sensor status;

using the software application and map of the sensor status to:
  integrate the software application with the system of the vehicle to send and receive messages from the vehicle;
  identify when a driver is in the vehicle;
  anticipate when the driver is about to exit a vehicle;
  identify when other occupants are present in the vehicle;
triggering one or more alarm of the vehicle using the software application when the presence of an unattended child or person is identified with the vehicle; and
sending one or more alert to a mobile device when the presence of an unattended child or person is identified within the vehicle.

12. The method of claim 11, further comprising:
escalating the one or more alert and one or more alarm through the use of audio, visual, or vibration-based cues until the sensor status indicates that the unattended child or person is removed from the vehicle;
issuing an alert to emergency services containing location-based information and vehicle-identifying information if the unattended child or person is not removed within a designated time.

13. The method of claim 11, further comprising:
operating the sensors of the vehicle to reduce hazardous conditions in the vehicle.

14. A method for deciphering and mapping signals from a control unit, the method comprising:
  a. Accessing a data stream from the control unit, identifying the speed and protocol being used by the control unit, and adapting a processor to receive the data stream from the control unit;
  b. Continuously downloading the data stream from the control unit;
  c. Initializing a negative mask list, a positive mask list and a candidate list,
  d. Ensuring a targeted sensor is not in use;
  e. Building the negative mask list;
  f. Exercising a targeted sensor;
  g. Receiving a sensor signal from the targeted sensor;
  h. Building the positive mask list;
  i. Building the candidate list;
  j. Repeating steps (a)-(i) to narrow the candidate list;
  k. Mapping a sensor status with the relevant candidate in the candidate list to create a map of the sensor status;
  wherein the processing unit comprises a dongle;
    the dongle further comprising a processor, a communication component, and a connection component;
  the connection component is adapted to connect to the control unit;
  wherein the candidate list further comprises:
    a list of potential candidates comprising at least one candidate;
    each candidate in the list of potential candidates being associated with an identifier, a positive mask, and a negative mask;
  wherein building the negative mask list further comprises:
    identifying one or more changing data for each identifier;
    marking the one or more changing data for each identifier in the negative mask list;
    updating the negative mask associated with each identifier in the candidate list to contain the data from the negative mask list;
  wherein building the positive mask list further comprises:
    identifying one or more changing data for each identifier;
    marking the one or more changing data for each identifier in the positive mask list;
    updating the positive mask associated with each identifier in the candidate list to contain the data from the positive mask list;
  wherein building the candidate list further comprises:
    for each identifier in the candidate list, combining the negative mask and the positive mask to create a combined mask;
    for each candidate in the candidate list, removing the candidate if the combined mask is null;
    wherein mapping the sensor status with the relevant candidate in the candidate list to create a map of the sensor status further comprises:
    exercising the targeted sensor;
    observing one or more altered data in the data stream from the control unit when the targeted sensor is exercised; and
    mapping the altered data to correspond to the state of the sensor.

15. The method of claim 14, further comprising:
inserting a delay after exercising the targeted sensor and receiving signals from the targeted sensor; and
continuing to build the positive mask list during the delay.

16. The method of claim 14, further comprising:
a software application being adapted to receive the map of the sensor status;
the software application being adapted to use the system of the vehicle to identify the presence of a person within the vehicle using the map of the sensor status;
using the software application and map of the sensor status to:
  integrate the software application with the system of the vehicle to send and receive messages from the vehicle;
  identify when a driver is in the vehicle;
  anticipate when the driver is about to exit a vehicle;
  identify when other occupants are present in the vehicle;
triggering one or more alarm of the vehicle using the software application when the presence of an unattended child or person is identified with the vehicle; and
sending one or more alert to a mobile device when the presence of an unattended child or person is identified within the vehicle.

17. The method of claim 16, further comprising:
escalating the one or more alert and one or more alarm through the use of audio, visual, or vibration-based cues until the sensor status indicates that the unattended child or person is removed from the vehicle; and
issuing an alert to emergency services containing location-based information and vehicle-identifying information if the unattended child or person is not removed within a designated time.

18. The method of claim 17, further comprising:
the software application being configured to operate the sensors of the vehicle based on the map of the sensor status; and
operating the sensors of the vehicle to reduce hazardous conditions in the vehicle.

19. A method for deciphering and mapping signals from a control unit, the method comprising:

a. Accessing a data stream from the control unit, identifying the speed and protocol being used by the control unit, and adapting a processor to receive the data stream from the control unit;
b. Continuously downloading the data stream from the control unit;
c. Initializing a negative mask list, a positive mask list and a candidate list,
d. Ensuring a targeted sensor is not in use;
e. Building the negative mask list;
f. Exercising a targeted sensor;
g. Receiving a sensor signal from the targeted sensor;
h. Building the positive mask list;
i. Building the candidate list;
j. Repeating steps (a)-(i) to narrow the candidate list;
k. Mapping a sensor status with the relevant candidate in the candidate list to create a map of the sensor status;
wherein the processing unit comprises a dongle;
the dongle further comprising a processor, a communication component, and a connection component;
the connection component is adapted to connect to the control unit;
wherein the candidate list further comprises:
   a list of potential candidates comprising at least one candidate;
   each candidate in the list of potential candidates being associated with an identifier, a positive mask, and a negative mask;
wherein building the negative mask list further comprises:
   identifying one or more changing data for each identifier;
   marking the one or more changing data for each identifier in the negative mask list;
   updating the negative mask associated with each identifier in the candidate list to contain the data from the negative mask list;
wherein building the positive mask list further comprises:
   identifying one or more changing data for each identifier;
   marking the one or more changing data for each identifier in the positive mask list;
   updating the positive mask associated with each identifier in the candidate list to contain the data from the positive mask list;
wherein building the candidate list further comprises:
   for each identifier in the candidate list, combining the negative mask and the positive mask to create a combined mask;
   for each candidate in the candidate list, removing the candidate if the combined mask is null;

wherein mapping the sensor status with the relevant candidate in the candidate list to create a map of the sensor status further comprises:
exercising the targeted sensor;
observing one or more altered data in the data stream from the control unit when the targeted sensor is exercised;
mapping the altered data to correspond to the state of the sensor;
inserting a delay after exercising the targeted sensor and receiving signals from the targeted sensor; and
continuing to build the positive mask list during the delay.

20. The method of claim 19, further comprising:
a software application being adapted to receive the map of the sensor status;
the software application being adapted to use the system of the vehicle to identify the presence of a person within the vehicle using the map of the sensor status;
the software application being configured to operate the sensors of the vehicle based on the map of the sensor status;
using the software application and map of the sensor status to:
   integrate the software application with the system of the vehicle to send and receive messages from the vehicle;
   identify when a driver is in the vehicle;
   anticipate when the driver is about to exit a vehicle;
   identify when other occupants are present in the vehicle;
triggering one or more alarm of the vehicle using the software application when the presence of an unattended child or person is identified with the vehicle;
sending one or more alert to a mobile device when the presence of an unattended child or person is identified within the vehicle;
escalating the one or more alert and one or more alarm through the use of audio, visual, or vibration-based cues until the sensor status indicates that the unattended child or person is removed from the vehicle;
issuing an alert to emergency services containing location-based information and vehicle-identifying information if the unattended child or person is not removed within a designated time; and
operating the sensors of the vehicle to reduce hazardous conditions in the vehicle.

* * * * *